(12) United States Patent
Dustin et al.

(10) Patent No.: US 11,315,282 B2
(45) Date of Patent: Apr. 26, 2022

(54) SYSTEM AND METHOD OF IMAGING EVIDENCE AT A SCENE

(71) Applicant: FARO Technologies, Inc., Lake Mary, FL (US)

(72) Inventors: David J. Dustin, Adairsville, GA (US); Dennis C. Sweet, Chardon, OH (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

(21) Appl. No.: 16/998,688

(22) Filed: Aug. 20, 2020

(65) Prior Publication Data
US 2021/0056724 A1 Feb. 25, 2021

Related U.S. Application Data

(60) Provisional application No. 62/890,902, filed on Aug. 23, 2019.

(51) Int. Cl.
*G06T 7/73* (2017.01)
*G06K 9/00* (2006.01)

(52) U.S. Cl.
CPC ............ *G06T 7/73* (2017.01); *G06K 9/00624* (2013.01); *G06T 2207/10028* (2013.01); *G06T 2207/30204* (2013.01)

(58) Field of Classification Search
CPC .. G06T 7/30; G06T 7/33; G06T 7/337; G06T 7/50; G06T 7/521; G06T 7/70; G06T 7/73; G06T 7/74; G06T 2207/10028; G06T 2207/30204; G06K 9/00201; G06K 9/00624; G06K 9/00664
See application file for complete search history.

(56) References Cited

U.S. PATENT DOCUMENTS

| | | | |
|---|---|---|---|
| 7,403,268 B2 | 7/2008 | England et al. | |
| 7,477,359 B2 | 1/2009 | England et al. | |
| 7,477,360 B2 | 1/2009 | England et al. | |
| 7,551,771 B2 | 6/2009 | England, III | |
| 7,777,761 B2 | 8/2010 | England et al. | |
| 7,974,461 B2 | 7/2011 | England et al. | |
| 8,705,012 B2 | 4/2014 | Greiner et al. | |
| 8,879,825 B2 | 11/2014 | England et al. | |
| 9,002,062 B2 | 4/2015 | Aller | |

(Continued)

OTHER PUBLICATIONS

Colwill, S., "Low-Cost Crime Scene Mapping: Reviewing Emerging Freeware, Low-Cost Methods of 3D Mapping and Applying Them to Crime Scene Investigation and Forensic Evidence" thesis, The School of Veterinary and Life Sciences Murdoch Univ, 2016; 80pgs.

(Continued)

*Primary Examiner* — Andrew W Johns
(74) *Attorney, Agent, or Firm* — Cantor Colburn LLP

(57) ABSTRACT

A system and method for documenting a scene having evidence markers is provided. The method includes placing the evidence markers in the scene. A plurality of 3D coordinates of points are measured on surfaces in the environment, a first portion of the plurality of 3D coordinates being on a first evidence marker of the evidence markers, the evidence marker having a photogrammetric symbol on one surface. A point cloud is generated from the plurality of 3D coordinates. The first evidence marker in the point cloud based is automatically identified at least in part on the photogrammetric symbol. The location and at least one attribute of the evidence marker are stored.

17 Claims, 20 Drawing Sheets

(56) References Cited

U.S. PATENT DOCUMENTS

| | | | |
|---|---|---|---|
| 2006/0181527 A1 | 8/2006 | England et al. | |
| 2006/0182314 A1 | 8/2006 | England et al. | |
| 2006/0193179 A1 | 8/2006 | England et al. | |
| 2006/0193521 A1 | 8/2006 | England et al. | |
| 2006/0221072 A1* | 10/2006 | Se et al. | G06T 7/593 |
| | | | 345/420 |
| 2006/0244746 A1 | 11/2006 | England et al. | |
| 2006/0255749 A1 | 11/2006 | Glassner | |
| 2018/0364033 A1* | 12/2018 | Doring et al. | H04N 5/232 |

OTHER PUBLICATIONS

EfficientGov Sponsors, Forensic Scanning Cuts Washington Police Crime Scene Time Dec. 7, 2018, Retrieved from interenet https://efficientgov.com/blog/2018/12/07/forensic-scanning-cuts-washington-police-crime-scene-time/ Retrieved on Aug. 12, 2019, 13 pgs.

England, et al., U.S. Appl. No. 60/652,208, entitled "Methods and Systems for Acquisition, Registration, Display and Measurement Using Rangefinder Scans" 166 pgs.

LIDAR News, UAV Based Accident and Crime Scene Investigation, Nov. 19, 2015, Retreived from internet https://lidarnews.com/project-showcase/uav-based-accident-and-crime-scene-investigation/ Retreived Mar. 12, 2019, 9 pgs.

McFadden, Chad, "Laser scanning provides important benefits for investigators" Retrieved from internet https://www.crime-scene-investigator.net/laser-scanning-provides-important-benefits-for-investigators.html, retrieved on Aug. 12, 2019, 13 pgs.

Pix4D, "Collision and crime scene investigation with drones" Nov. 25, 2014, Retrieved from internet https://www.pix4d.com/blog/accident-and-crime-scene-investigation, retrieved Aug. 12, 2019, 6 pgs.

\* cited by examiner

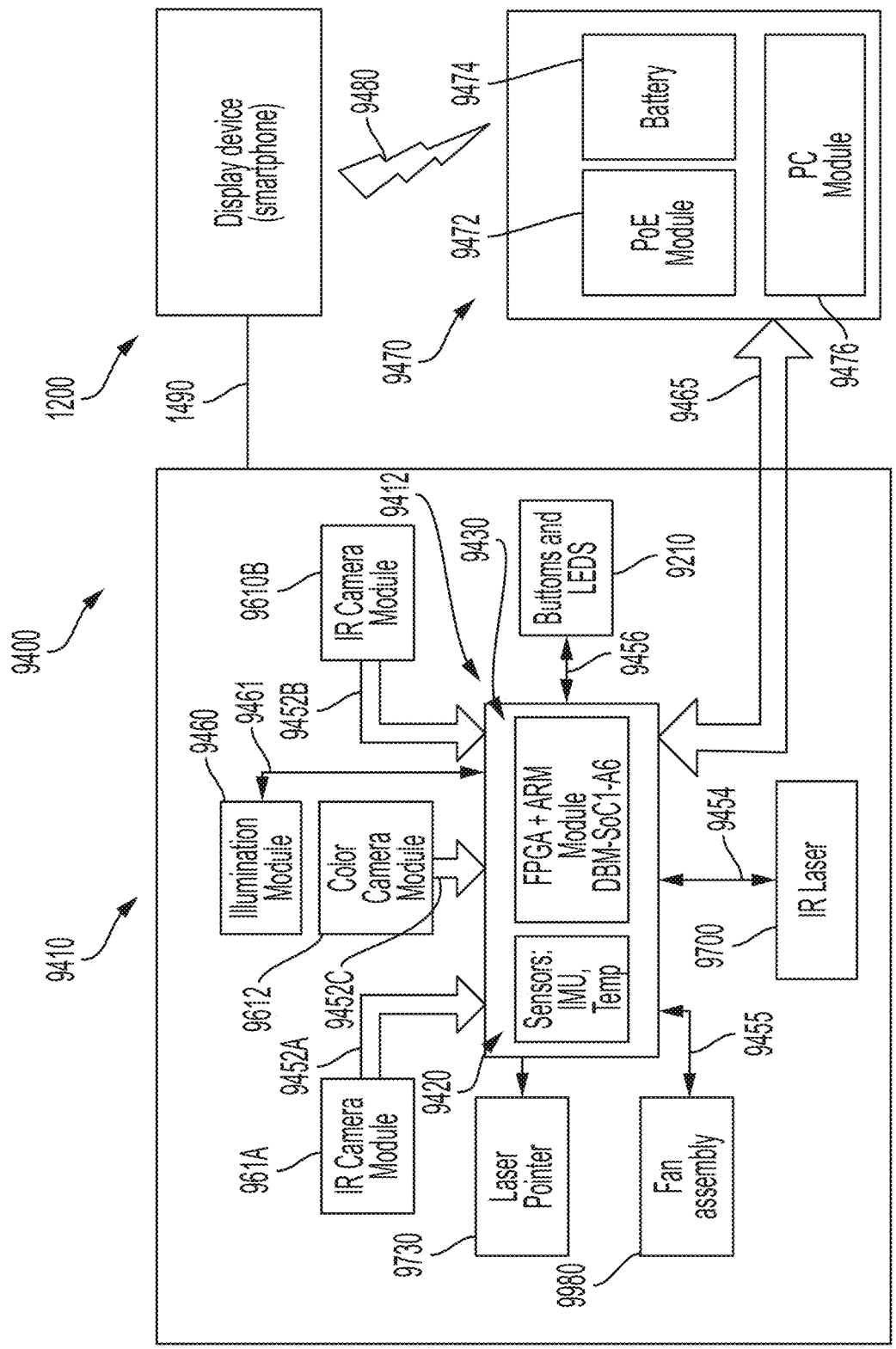

SYSTEM AND METHOD OF IMAGING EVIDENCE AT A SCENE

CROSS REFERENCE TO RELATED APPLICATIONS

This application claims the benefit of U.S. Provisional Application Ser. No. 62/890,902, filed Aug. 23, 2019, the entire disclosure of which is incorporated herein by reference.

BACKGROUND

The subject matter disclosed herein relates to a system and method for processing a scene, such as a crime scene, and in particular to a system for automatically processing evidence markers in a point cloud.

Crime scenes often have various objects that public safety officials desire to track. This tracking not only includes particulars about the object (e.g. identification, size, weight), but also its location and orientation within the environment relative to other objects. To document the location and orientation of the object, the public safety officials may use evidence markers 10, sometimes referred to as targets or tents, similar to that shown in FIG. 1. These markers 10 have similar characteristics in that they have alphanumeric symbols 12 on multiple surfaces and possibly one or more scale indicators 24. The symbols 12 are on multiple surfaces to allow the evidence/object to be photographed from multiple angles with the symbol 12 visible. The scale indicators 14 allow the public safety officials to estimate the size of the object when viewed in photographs.

Once the public safety officials have placed markers 10 next to each of the objects of interest, photographs of the scene are taken from a variety of angles to document the relative location and orientation of the object(s) in the scene. The public safety officials note the alphanumeric symbol for each object to allow later documentation of the scene. It should be appreciated that while photographs are valuable in documenting the scene, there are limitations to the amount of information that may be extracted at a later point in time. For example, exact measurements or distances between objects are difficult to determine from photographs.

In some instances, the public safety officials may also perform a three-dimensional (3D) scan of the scene using a triangulation based or time of flight based scanner. These devices allow for the measurement of 3D coordinates of points on surfaces in the objects to generate what is typically referred to as a point cloud. It should be appreciated that this allows for the generation of a realistic 3D model of the scene. Thereafter, the public safety officials can make measurements between any points in the scene with a high level of accuracy. While the 3D model is very useful, the evidence markers 10 need to be manually located and marked in the model. It should be appreciated that some scenes, such as crime scenes for example, may have hundreds of markers. Making the manual process tedious and time consuming.

Accordingly, while existing systems and methods for documenting a scene are suitable for their intended purposes the need for improvement remains, particularly in providing a system and method for locating and identifying evidence markers in a 3D point cloud.

BRIEF DESCRIPTION

According to one aspect of the disclosure a method for documenting a scene having evidence markers is provided. The method includes placing the evidence markers in the scene. A plurality of 3D coordinates of points are measured on surfaces in the environment, a first portion of the plurality of 3D coordinates being on a first evidence marker of the evidence markers, the evidence marker having a photogrammetric symbol on one surface. A point cloud is generated from the plurality of 3D coordinates. The first evidence marker in the point cloud based is automatically identified at least in part on the photogrammetric symbol. The location and at least one attribute of the evidence marker are stored.

In addition to one or more of the features described herein, or as an alternative, further embodiments of the method may include the location being the center of the photogrammetric symbol. In addition to one or more of the features described herein, or as an alternative, further embodiments of the method may include the at least one attribute being an alphanumeric indicator. In addition to one or more of the features described herein, or as an alternative, further embodiments of the method may include the alphanumeric indicator being an evidence tag.

In addition to one or more of the features described herein, or as an alternative, further embodiments of the method may include displaying the point cloud, and associating data with the first evidence marker, wherein the data includes information on an object or substance adjacent the first evidence marker.

According to another aspect of the disclosure a system for documenting a scene is provided. The system includes at least one evidence marker, the evidence marker having a first side and an opposing second side, the first side having a photogrammetric symbol. A three-dimensional (3D) measurement device is configured to acquire a plurality of 3D coordinates of points on surfaces in the scene, the plurality of 3D coordinates including a first plurality of 3D coordinates of the first side. One or more processors configured to identify the at least one evidence marker based at least in part on the first plurality of 3D coordinates.

In addition to one or more of the features described herein, or as an alternative, further embodiments of the system may include the one or more processors being further configured to determine a location of the at least one evidence marker from the first plurality of 3D coordinates. In addition to one or more of the features described herein, or as an alternative, further embodiments of the system may include the location being determined based at least in part on the photogrammetric target. In addition to one or more of the features described herein, or as an alternative, further embodiments of the system may include the location is a center of the photogrammetric target.

In addition to one or more of the features described herein, or as an alternative, further embodiments of the system may include the at least one evidence marker further including an alphanumeric indicator on the first side and the second side. In addition to one or more of the features described herein, or as an alternative, further embodiments of the system may include the at least one evidence marker further having a first end and a second end, the first end and the second end each having a the alphanumeric indicator. In addition to one or more of the features described herein, or as an alternative, further embodiments of the system may include the one or more processors being further configured to associating data with the first evidence marker, wherein the data includes information on an object or substance adjacent the first evidence marker.

According to yet another aspect of the disclosure a computer program product for documenting a scene having at least one evidence marker, the computer program product comprising a computer readable storage medium having program instructions embodied therewith. The program instructions executable by a processor to cause the processor to perform: measuring a plurality of 3D coordinates of points on surfaces in the environment, a first portion of the plurality of 3D coordinates being on the at least one evidence marker, the at least one evidence marker having a photogrammetric symbol on one surface; generating a point cloud from the plurality of 3D coordinates; automatically identifying the first evidence marker in the point cloud based at least in part on the photogrammetric symbol; and storing the location and at least one attribute of the evidence marker.

In addition to one or more of the features described herein, or as an alternative, further embodiments of the computer program product may include the location being the center of the photogrammetric symbol. In addition to one or more of the features described herein, or as an alternative, further embodiments of the computer program product may include the at least one attribute being an alphanumeric indicator. In addition to one or more of the features described herein, or as an alternative, further embodiments of the computer program product may include the alphanumeric indicator being an evidence tag. In addition to one or more of the features described herein, or as an alternative, further embodiments of the computer program product may include displaying the point cloud, and associating data with the first evidence marker, wherein the data includes information on an object or substance adjacent the first evidence marker.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIGS. 9A-14 are various view of a triangular based scanner for use with the method of FIG. 3.

The detailed description explains embodiments of the disclosure, together with advantages and features, by way of example with reference to the drawings.

DETAILED DESCRIPTION

Embodiments of the present disclosure are directed to a system for documenting a scene, such as a crime scene for example, that includes at least one evidence marker. Embodiments include a system that automatically identify the at least one evidence marker. Further embodiments include a system where the location of the at least one evidence marker is determined based on a photogrammetric symbol located on one side of the at least one evidence marker. Still further embodiments provide for a system that allows the operator to associate data, such as information related to an adjacent object for example, with the at least one evidence marker.

Figure 2A:
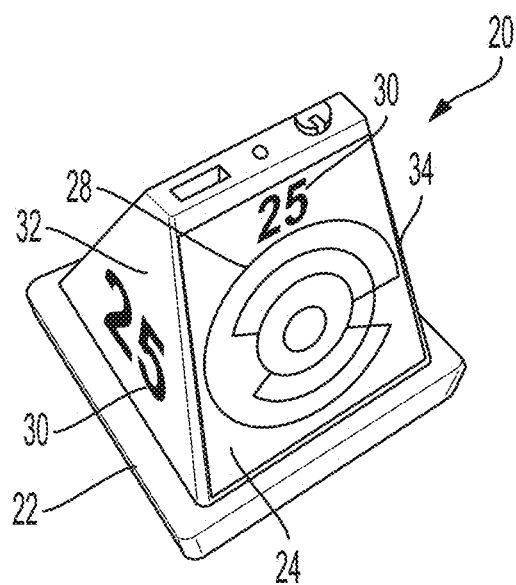
FIG. 2A is a perspective view of an evidence marker in according to an embodiment.
Figure 2B:
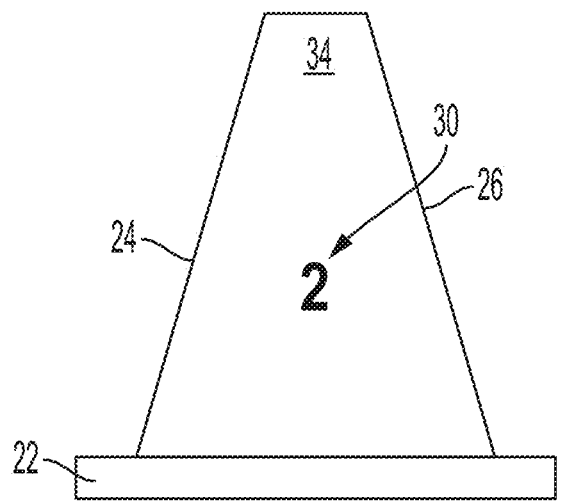
FIG. 2B is a side view of the evidence marker of FIG. 2A.
Figure 2C:
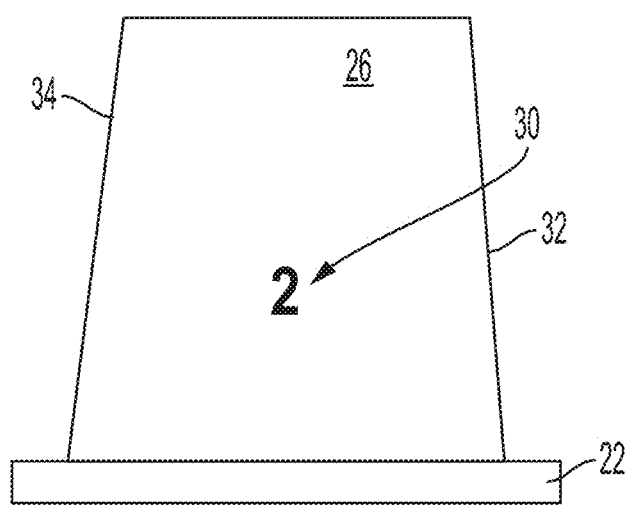
FIG. 2C is a front view of the evidence marker of FIG. 2A.

Referring now to FIG. 2A-2C, an embodiment of an evidence marker 20 is provided. The evidence marker 20 includes a base 22. Extending from the base 22 is a first side 24 and an opposing second side 26. The first side includes a photogrammetric target 28. It should be noted that photogrammetric targets are sometimes referred to as fiducial markers. In the illustrated embodiment, the photogrammetric target 28 is a coded symbol that is associated with an alphanumeric value (e.g. a number or a letter). As will be discussed in more detail herein, the photogrammetric target 28 allows the system to identify the evidence marker 20 within a point cloud and also generate a location for the evidence marker 20 at the center of the photogrammetric target 28. In some embodiments, the photogrammetric target 28 has a circular shape that allows the target to be viewed over a large angular range. Each of the sides further includes an alphanumeric indicator 30.

The evidence marker 20 further includes a pair of ends 32, 34 that extend between the sides 24, 26. In the illustrated embodiment, the alphanumeric indicator 30 is arranged on each of the sides 24, 26 and ends 32, 34. It should be appreciated that having the alphanumeric indicators 30 on each of the sides allows the visual identification from a variety of directions. In the illustrated embodiment, the evidence marker 20 includes the photogrammetric target 28 on only the first side 24. As will be discussed in more detail herein, by having the photogrammetric target 28 on only one side, a technical effect is provided that allows for a unique or single location of the target to be automatically identified in a point cloud.

In the illustrated embodiment, each of the sides 24, 26 and ends 32, 34 are angled towards a center of the evidence marker 20. In an embodiment, the evidence marker 20 has a frusto-pyramidal shape.

Figure 2D:
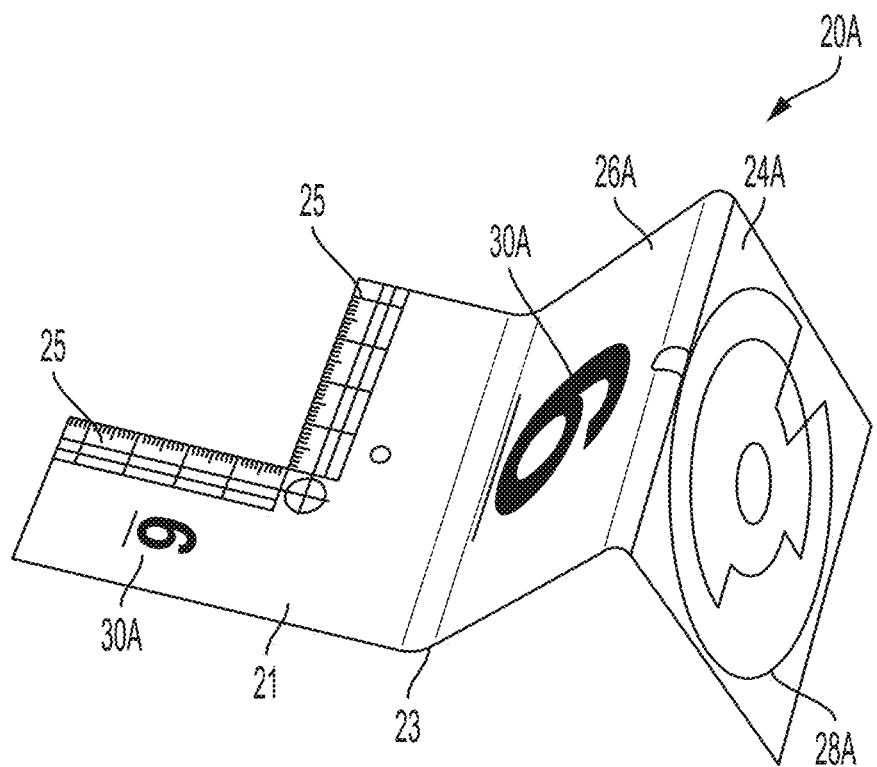
FIG. 2D is a perspective view of an evidence marker in accordance with another embodiment.

It should be appreciated that that while embodiments herein show and describe the evidence marker 20 as having the frusto-pyramidal shape, this is for exemplary purposes and the claims should not be so limited. In other embodiments, the evidence marker may have other shapes. For example, in the embodiment of FIG. 2D, an evidence marker 20A is shown. In this embodiment, the marker 20A includes a first side 24A and a second side 26A arranged on an angle relative to each other to form an upstanding body (e.g. a tent shape). The first side 24A includes a photogrammetric target 28A. The second side 26A includes an alphanumeric indicator 30A. In this embodiment, the evidence marker 20A includes a planar projection 21 that extends from an end 23 of the second side 26A. The planar projection 21 is disposed to lay flat on a surface that the evidence marker 20A is placed. In an embodiment, the planar projection 21 includes one or more scale bars 25. The planar projection may further include an alphanumeric indicator 30A.

Figure 3:
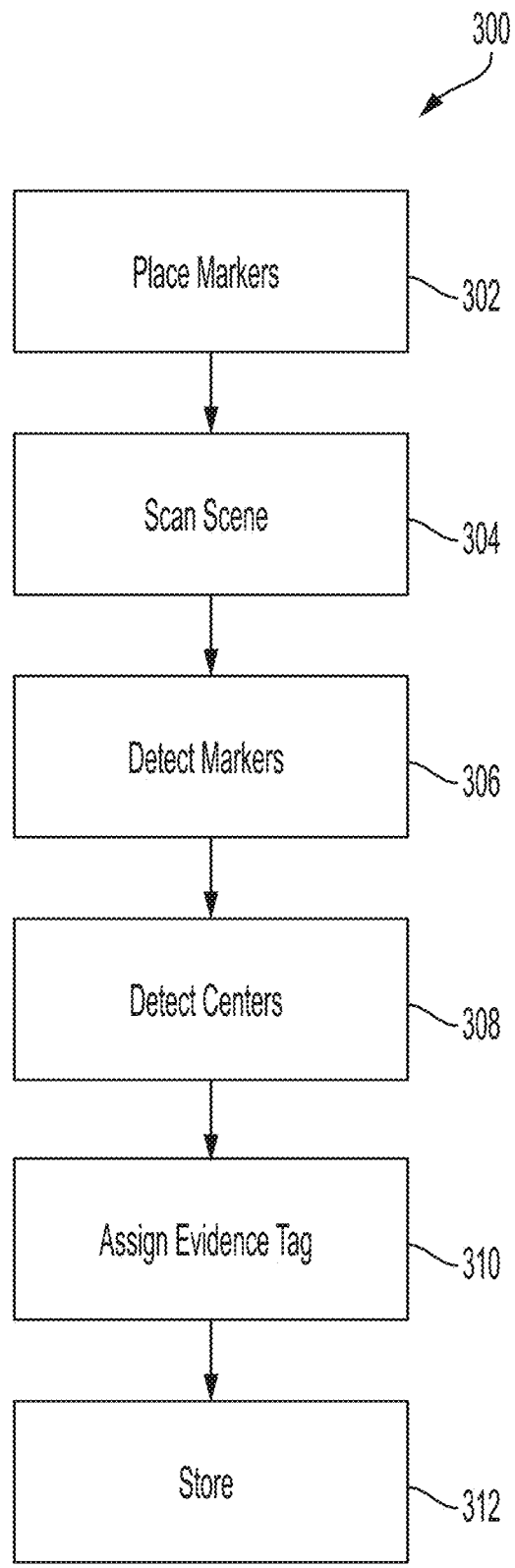
FIG. 3 is a flow diagram of method of processing a scene and identifying evidence markers in accordance with an embodiment.

Referring now to FIG. 3, an embodiment is shown of a method 300 for documenting a scene, such as a crime scene for example. The method 300 begins in block 302 where the operator positions evidence markers 20 in the environment or scene at locations that include objects or areas of interest. The objects may include items such as tools, weapons, shell casings, or fluids for example. The method 300 then proceeds to block 304 where the environment is scanned using a 3D measurement device, such as a time of flight scanner or a triangulation-based scanner for example. The 3D measurement device measures the 3D coordinates of a plurality of points within the scene, including at least the side 24 of the evidence marker 20. It should be appreciated that the scanning of the scene may be comprised of a plurality of scans that are performed from different locations within the environment or scene. The 3D coordinates or points from each of the plurality of scans are registered together in a common frame of reference. The measurement of the 3D coordinates generates what is known as a "point cloud" that can be used to create a computer model of the scene that includes the evidence markers. As used herein, a point cloud is a collection of a plurality of 3D coordinates of surfaces in the environment that were acquired by a coordinate measurement devices, such as devices 820, 910 (FIG. 8A, 9A) for example, a registered in a common coordinate frame of reference. The collection of 3D coordinates may be represented as points in space when viewed on a computer display.

Figure 4:
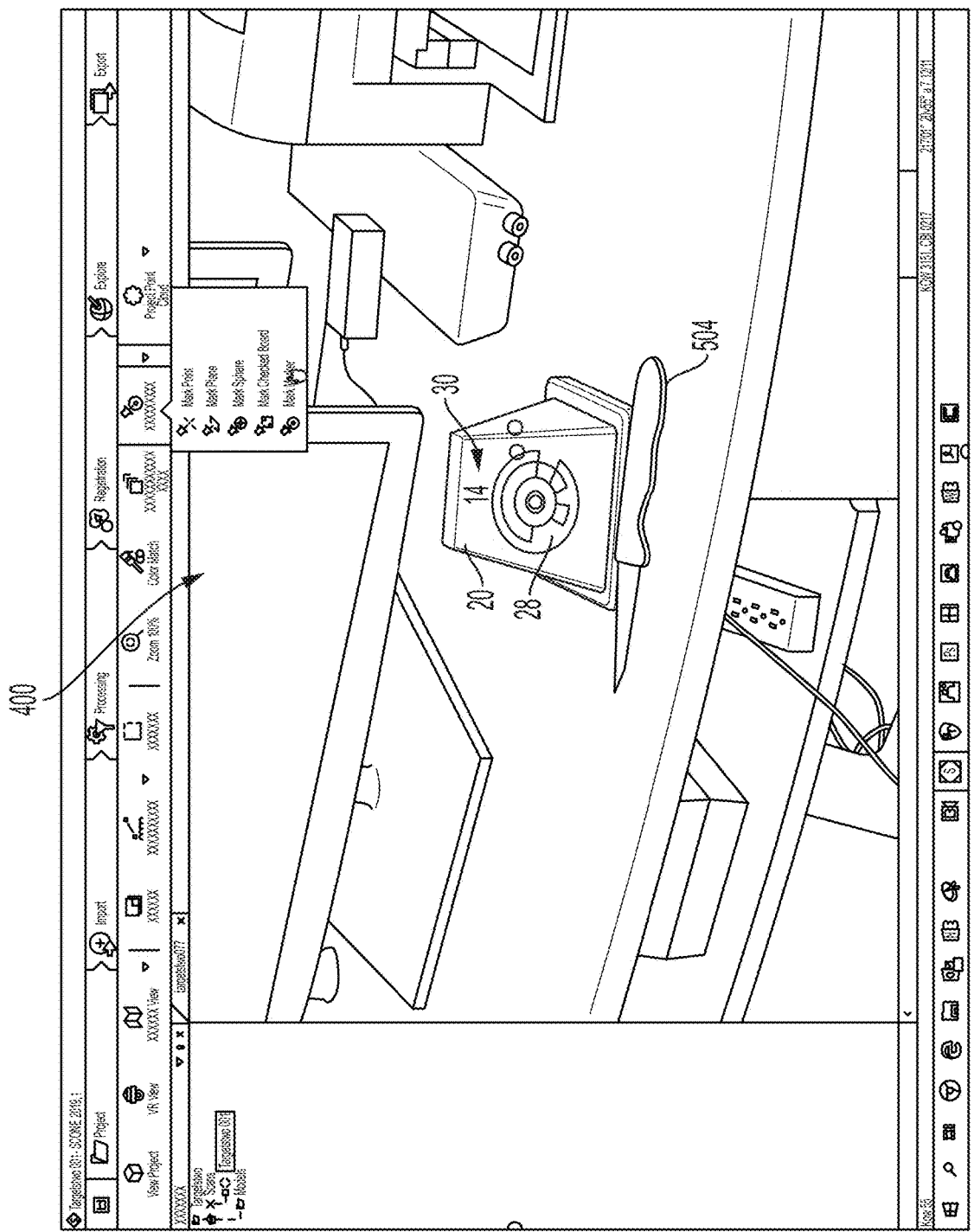
FIG. 4 is an image of a point cloud that includes an evidence marker.

The method 300 then proceeds to block 306 where the evidence markers 20 are detected or identified within the point cloud as shown in the point cloud 400 of FIG. 4. In an embodiment, the detection or identification of the evidence markers may be automatically performed by a computing device. In the illustrated embodiment, the evidence markers 20 are identified based on pattern recognition of the photogrammetric symbol 28. In an embodiment where the 3D measurement device emits a light that is reflected off of surfaces within the scene. The irradiance (optical power per unit area) of this reflected light is measured and used to generate a gray scale value for that measurement. In other words, these gray scale values provide a contrast in transitions between the black and white portions of the photogrammetry symbols 28. A processor may then identify the symbol based on the reconstructed pattern of the target. In embodiments with multiple evidence markers 20, the method 300 will proceed to identify each of the evidence markers within the point cloud.

Figure 5:
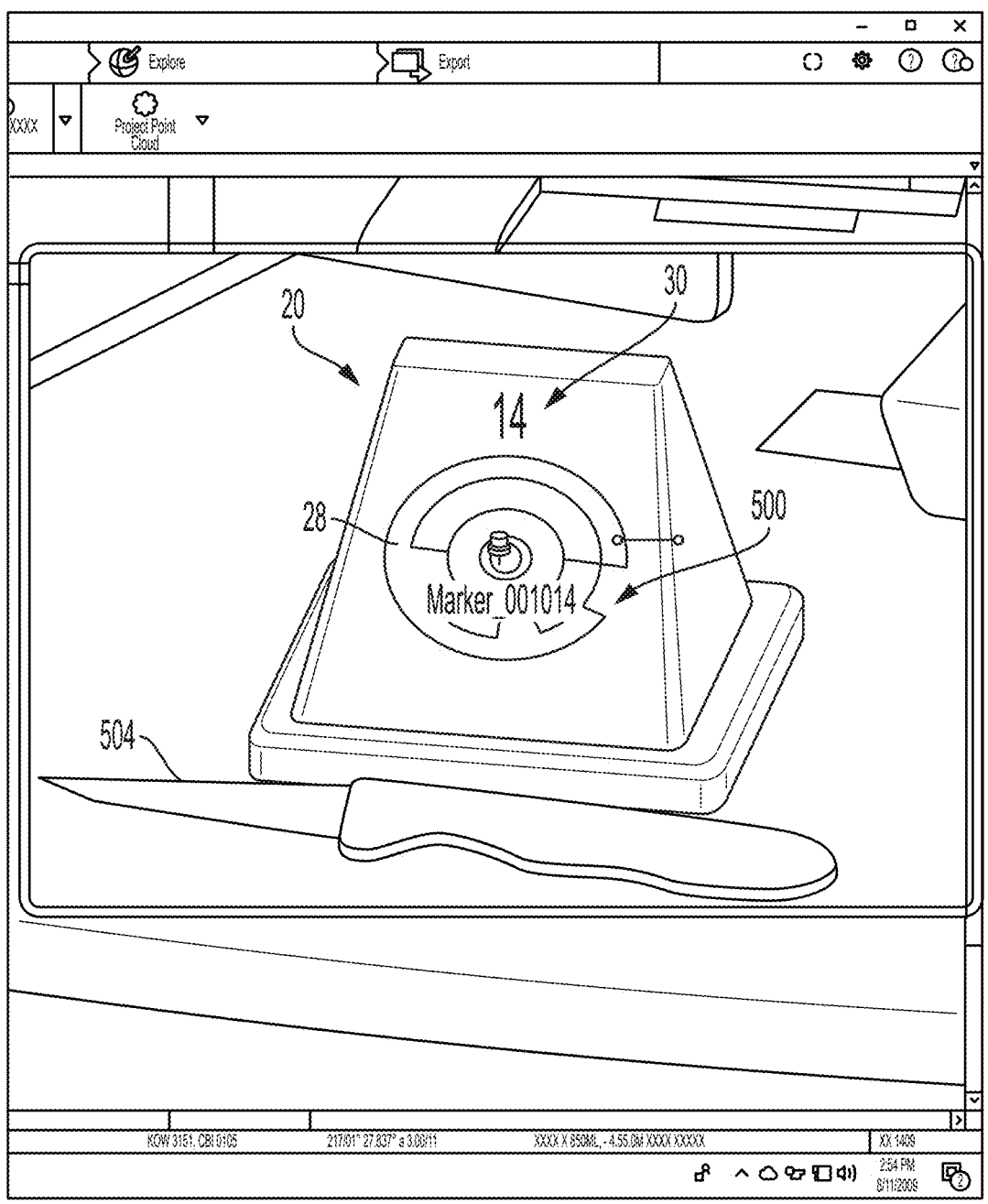
FIG. 5 is an enlarged image of the evidence marker of FIG. 4.
Figure 6:
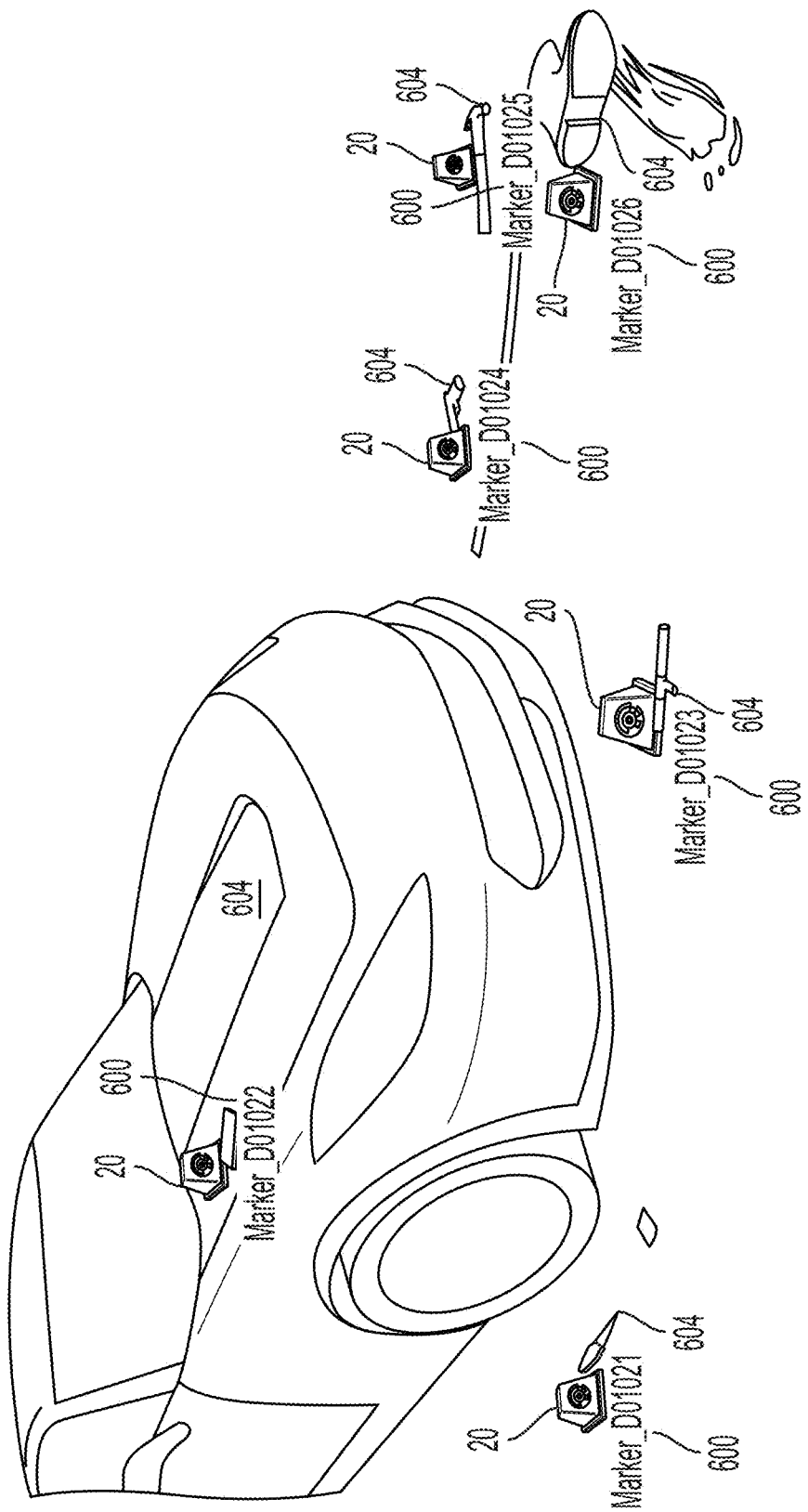
FIG. 6 is a perspective view of a point cloud of a scene having evidence markers.
Figure 7:
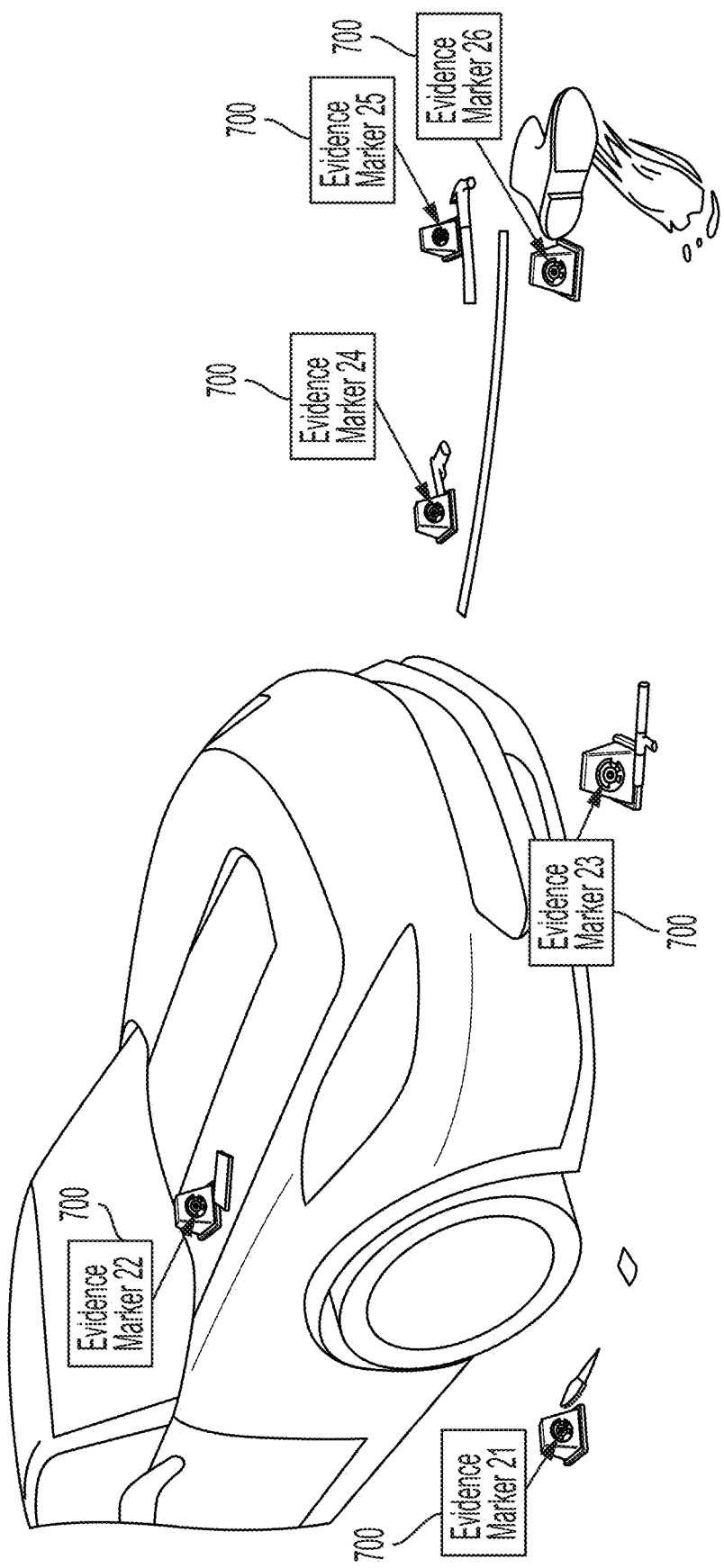
FIG. 7 is the image of FIG. 6 annotated to document the scene.

In an embodiment, the photogrammetric symbol 28 is a coded symbol that corresponds to the alphanumeric indicator 30. In an embodiment, the method 300 labels 500, 600 (FIG. 5, FIG. 6) each evidence marker 20. In an embodiment, the method 300 then proceeds to block 308 where the center 502 of each identified photogrammetric symbol 28 is located. It should be appreciated that this provides a point in space that identifies the location of the evidence marker 20. The method 300 then proceeds to block 310 where attributes associated with the evidence marker 20 may be entered by the operator. For example, in some embodiments information from an evidence tag is associated with the evidence marker 20. This information may include, but is not limited to: police identification number, the date, the time, a description of the object 504, 604, who collected the object, a make, and a model or brand of the object. In some embodiments, the operator may augment the visual display of the point cloud to include the evidence marker information 700 (FIG. 7) and/or the evidence tag information. The associated data, or meta-data for each evidence marker 20 is then stored in memory with the point cloud in block 312.

Referring now to FIG. 8A-8D, an embodiment of a 3D measuring device is shown that may be used in the method 300. In this embodiment, the 3D measuring device is a laser scanner 820. The laser scanner 820 has a measuring head 822 and a base 824. The measuring head 822 is mounted on the base 824 such that the laser scanner 820 may be rotated about a vertical axis 823. In one embodiment, the measuring head 822 includes a gimbal point 827 that is a center of rotation about the vertical axis 823 and a horizontal axis 825. The measuring head 822 has a rotary mirror 826, which may be rotated about the horizontal axis 825. The rotation about the vertical axis may be about the center of the base 824. The terms vertical axis and horizontal axis refer to the scanner in its normal upright position. It is possible to operate a 3D coordinate measurement device on its side or upside down, and so to avoid confusion, the terms azimuth axis and zenith axis may be substituted for the terms vertical axis and horizontal axis, respectively. The term pan axis or standing axis may also be used as an alternative to vertical axis.

The measuring head 822 is further provided with an electromagnetic radiation emitter, such as light emitter 828, for example, that emits an emitted light beam 830. In one embodiment, the emitted light beam 830 is a coherent light beam such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 830 is amplitude or intensity modulated, for example, with a sinusoidal waveform or with a rectangular waveform. The emitted light beam 830 is emitted by the light emitter 828 onto a beam steering unit, such as mirror 826, where it is deflected to the environment. A reflected light beam 832 is reflected from the environment by an object 834. The reflected or scattered light is intercepted by the rotary mirror 826 and directed into a light receiver 836. The directions of the emitted light beam 830 and the reflected light beam 832 result from the angular positions of the rotary mirror 826 and the measuring head 822 about the axes 825 and 823, respectively. These angular positions in turn depend on the corresponding rotary drives or motors.

Coupled to the light emitter 828 and the light receiver 836 is a controller 838. The controller 838 determines, for a multitude of measuring points X, a corresponding number of distances d between the laser scanner 820 and the points X on object 834. The distance to a particular point X is determined based at least in part on the speed of light in air through which electromagnetic radiation propagates from the device to the object point X. In one embodiment the phase shift of modulation in light emitted by the laser scanner 820 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation, the scanning of the volume around the laser scanner 20 takes place by rotating the rotary mirror 826 relatively quickly about axis 825 while rotating the measuring head 822 relatively slowly about axis 823, thereby moving the assembly in a spiral pattern. In an exemplary embodiment, the rotary mirror rotates at a maximum speed of 5820 revolutions per minute. For such a scan, the gimbal point 827 defines the origin of the local stationary reference system. The base 824 rests in this local stationary reference system.

In addition to measuring a distance d from the gimbal point 827 to an object point X, the scanner 820 may also collect gray-scale information related to the received optical power (equivalent to the term "brightness.") The gray-scale value may be determined at least in part, for example, by integration of the bandpass-filtered and amplified signal in the light receiver 836 over a measuring period attributed to the object point X.

Figure 1:
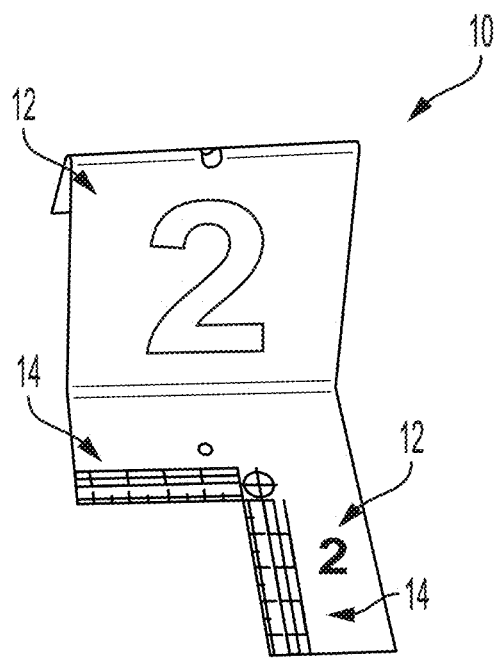
FIG. 1 is a perspective view of a prior art evidence marker.

The measuring head 822 may include a display device 840 integrated into the laser scanner 820. The display device 840 may include a graphical touch screen 841, as shown in FIG. 1, which allows the operator to set the parameters or initiate the operation of the laser scanner 820. For example, the screen 841 may have a user interface that allows the operator to provide measurement instructions to the device, and the screen may also display measurement results.

The laser scanner 820 includes a carrying structure 842 that provides a frame for the measuring head 822 and a platform for attaching the components of the laser scanner 820. In one embodiment, the carrying structure 842 is made from a metal such as aluminum. The carrying structure 842 includes a traverse member 844 having a pair of walls 846, 848 on opposing ends. The walls 846, 848 are parallel to each other and extend in a direction opposite the base 824. Shells 850, 852 are coupled to the walls 846, 848 and cover the components of the laser scanner 820. In the exemplary embodiment, the shells 850, 852 are made from a plastic material, such as polycarbonate or polyethylene for example. The shells 850, 852 cooperate with the walls 846, 848 to form a housing for the laser scanner 820.

On an end of the shells 850, 852 opposite the walls 846, 848 a pair of yokes 854, 856 are arranged to partially cover the respective shells 850, 852. In the exemplary embodiment, the yokes 854, 856 are made from a suitably durable material, such as aluminum for example, that assists in protecting the shells 850, 852 during transport and operation. The yokes 854, 856 each includes a first arm portion 858 that is coupled, such as with a fastener for example, to the traverse 844 adjacent the base 824. The arm portion 858 for each yoke 854, 856 extends from the traverse 844 obliquely to an outer corner of the respective shell 850, 852. From the outer corner of the shell, the yokes 854, 856 extend along the side edge of the shell to an opposite outer corner of the shell. Each yoke 854, 856 further includes a second arm portion that extends obliquely to the walls 846, 848. It should be appreciated that the yokes 54, 56 may be coupled to the traverse 842, the walls 846, 848 and the shells 850, 854 at multiple locations.

The pair of yokes 854, 856 cooperate to circumscribe a convex space within which the two shells 850, 852 are arranged. In the exemplary embodiment, the yokes 854, 856 cooperate to cover all of the outer edges of the shells 850, 854, while the top and bottom arm portions project over at least a portion of the top and bottom edges of the shells 850, 852. This provides advantages in protecting the shells 850, 852 and the measuring head 822 from damage during transportation and operation. In other embodiments, the yokes 854, 856 may include additional features, such as handles to facilitate the carrying of the laser scanner 820 or attachment points for accessories for example.

On top of the traverse 844, a prism 860 is provided. The prism extends parallel to the walls 846, 848. In the exemplary embodiment, the prism 860 is integrally formed as part of the carrying structure 842. In other embodiments, the prism 860 is a separate component that is coupled to the traverse 844. When the mirror 826 rotates, during each rotation the mirror 826 directs the emitted light beam 830 onto the traverse 844 and the prism 860. Due to nonlinearities in the electronic components, for example in the light receiver 836, the measured distances d may depend on signal strength, which may be measured in optical power entering the scanner or optical power entering optical detectors within the light receiver 836, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 836. Since the prism 860 is at a known distance from the gimbal point 827, the measured optical power level of light reflected by the prism 860 may be used to correct distance measurements for other measured points, thereby allowing for compensation to correct for the effects of environmental variables such as temperature. In the exemplary embodiment, the resulting correction of distance is performed by the controller 838.

In an embodiment, the base 824 is coupled to a swivel assembly (not shown) such as that described in commonly owned U.S. Pat. No. 8,705,012 ('012), which is incorporated by reference herein. The swivel assembly is housed within the carrying structure 842 and includes a motor 870 that is configured to rotate the measuring head 822 about the axis 823. In an embodiment, the angular/rotational position of the measuring head 822 about the axis 823 is measured by angular encoder 872.

An auxiliary image acquisition device 866 may be a device that captures and measures a parameter associated with the scanned area or the scanned object and provides a signal representing the measured quantities over an image acquisition area. The auxiliary image acquisition device 866 may be, but is not limited to, a pyrometer, a thermal imager, an ionizing radiation detector, or a millimeter-wave detector. In an embodiment, the auxiliary image acquisition device 866 is a color camera.

In an embodiment, a central color camera (first image acquisition device) 876 is located internally to the scanner and may have the same optical axis as the 3D scanner device. In this embodiment, the first image acquisition device 876 is integrated into the measuring head 822 and arranged to acquire images along the same optical pathway as emitted light beam 830 and reflected light beam 832. In this embodiment, the light from the light emitter 828 reflects off a fixed mirror 878 and travels to dichroic beam-splitter 880 that reflects the light 882 from the light emitter 828 onto the rotary mirror 826. In an embodiment, the mirror 826 is rotated by a motor 884 and the angular/rotational position of the mirror is measured by angular encoder. The dichroic beam-splitter 880 allows light to pass through at wavelengths different than the wavelength of light 882. For example, the light emitter 828 may be a near infrared laser light (for example, light at wavelengths of 780 nm or 1150 nm), with the dichroic beam-splitter 880 configured to reflect the infrared laser light while allowing visible light (e.g., wavelengths of 400 to 700 nm) to transmit through. In other embodiments, the determination of whether the light passes through the beam-splitter 880 or is reflected depends on the polarization of the light. The digital camera 876 obtains 2D images of the scanned area to capture color data to add to the scanned image. In the case of a built-in color camera having an optical axis coincident with that of the 3D scanning device, the direction of the camera view may be easily obtained by simply adjusting the steering mechanisms of the scanner—for example, by adjusting the azimuth angle about the axis 823 and by steering the mirror 826 about the axis 825.

Figure 8A:
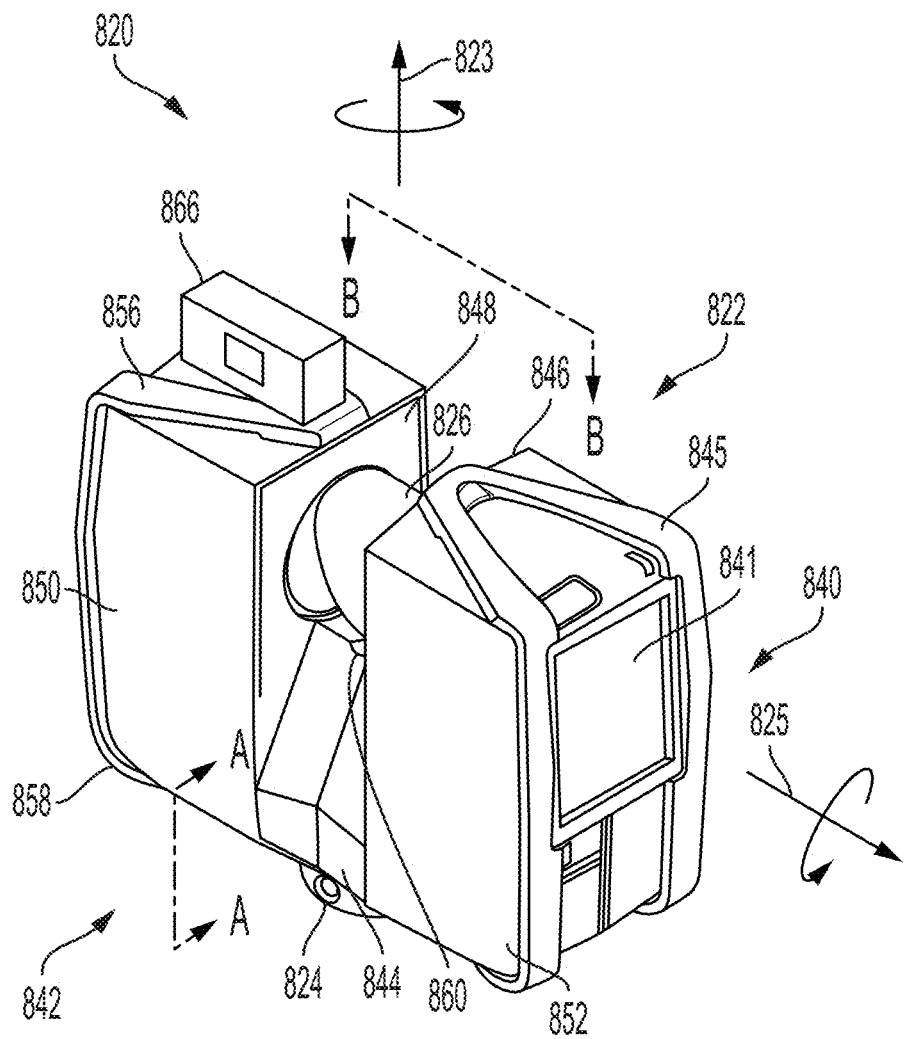
FIGS. 8A-8D are various views of a time of flight scanner for use with the method of FIG. 3.
Figure 8B:
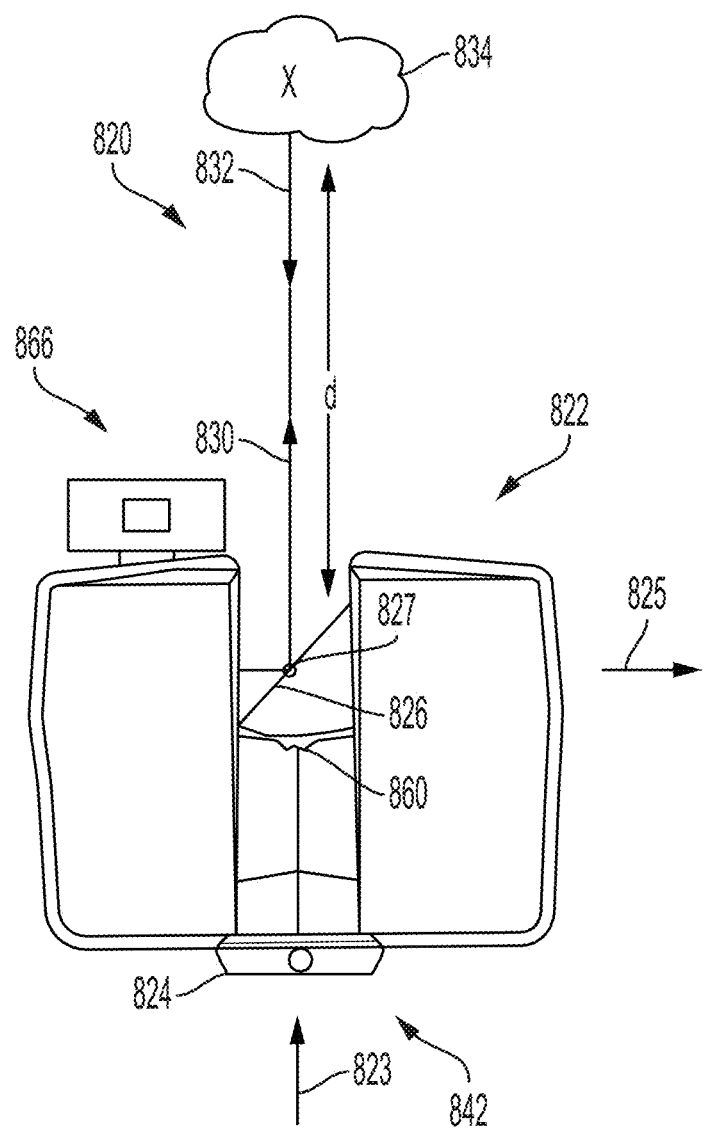
Figure 8C:
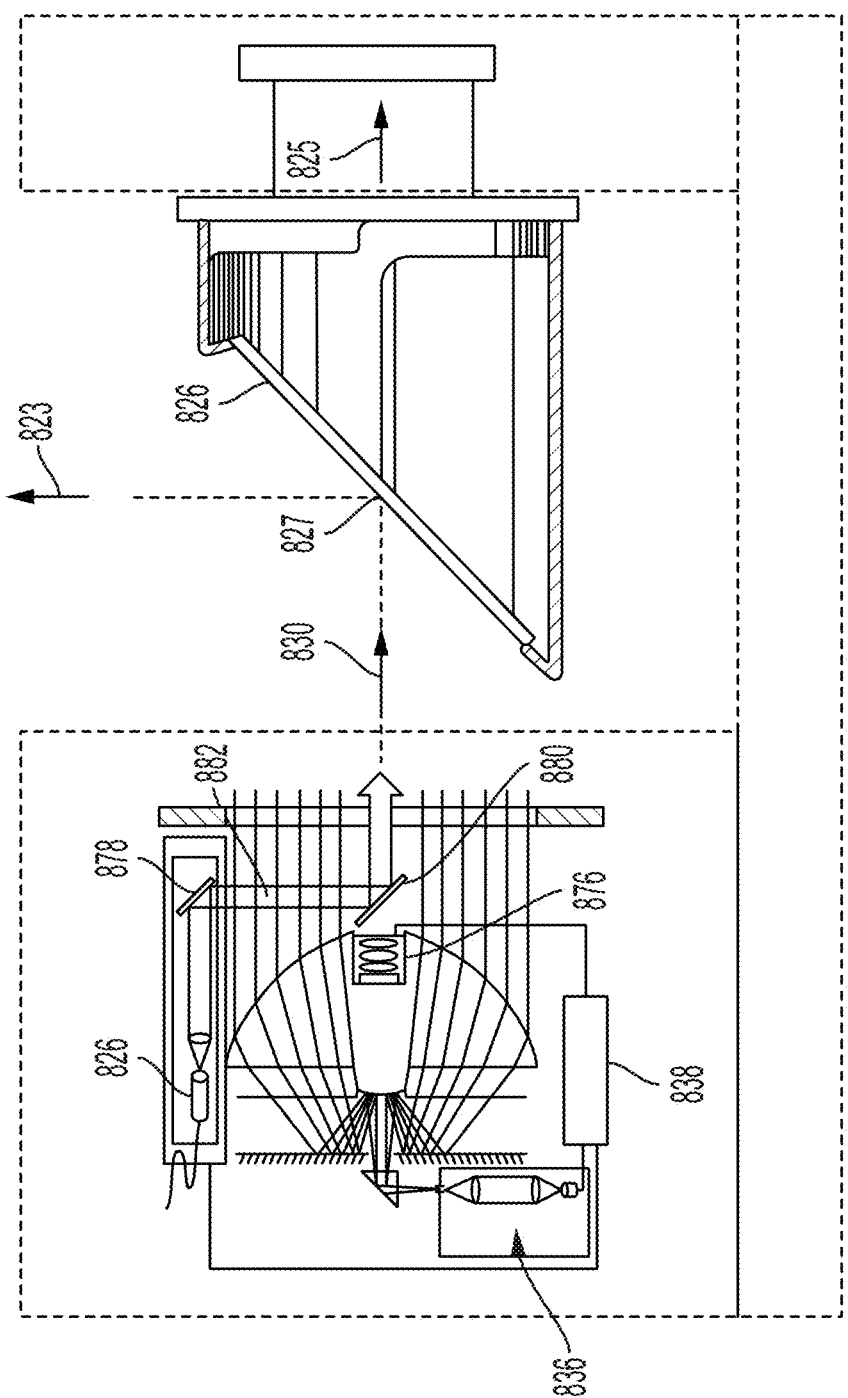
Figure 8D:
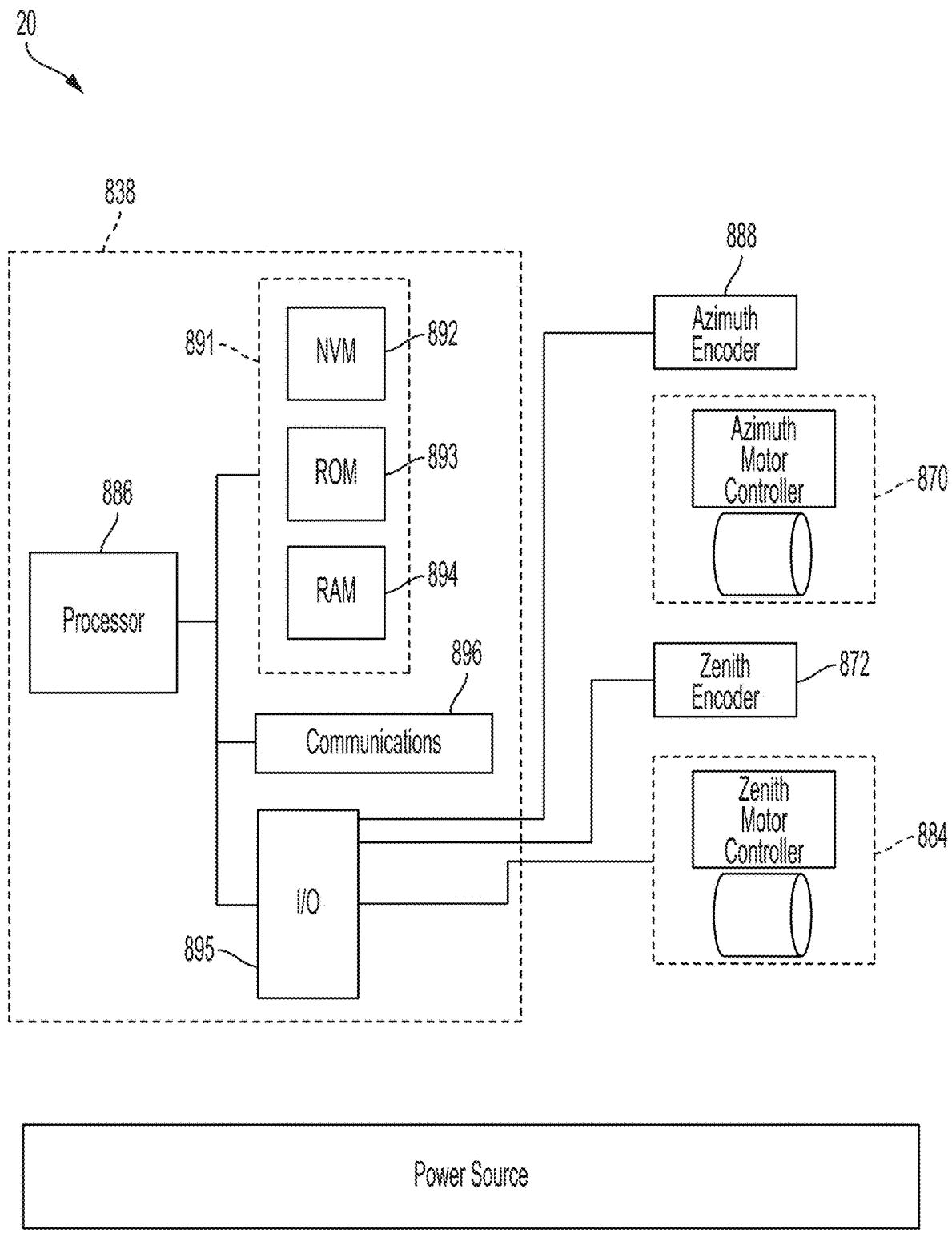
Figure 9A:
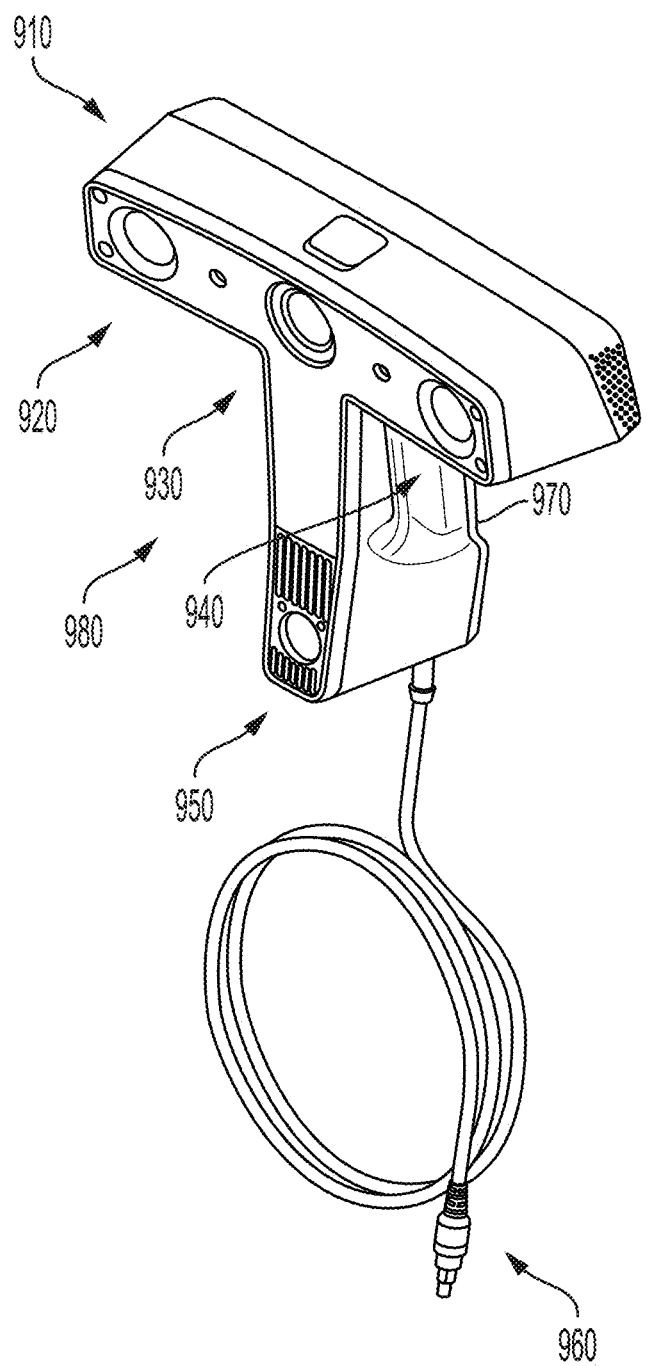

Referring now to FIG. 8D with continuing reference to FIGS. 8A-8C, elements are shown of the laser scanner 820. Controller 838 is a suitable electronic device capable of accepting data and instructions, executing the instructions to process the data, and presenting the results. The controller 838 includes one or more processing elements 886. The processors may be microprocessors, field programmable gate arrays (FPGAs), digital signal processors (DSPs), and generally any device capable of performing computing functions. The one or more processors 886 have access to memory 124 for storing information.

Controller 838 is capable of converting the analog voltage or current level provided by light receiver 836 into a digital signal to determine a distance from the laser scanner 820 to an object in the environment. Controller 838 uses the digital signals that act as input to various processes for controlling the laser scanner 820. The digital signals represent one or more laser scanner 820 data including but not limited to distance to an object, images of the environment, images acquired by panoramic camera 866, angular/rotational measurements by a first or azimuth encoder 888, and angular/rotational measurements by a second axis or zenith encoder 872.

In general, controller 838 accepts data from encoders 888, 872, light receiver 836, light source 828, and panoramic camera 866 and is given certain instructions for the purpose of generating a 3D point cloud of a scanned environment. Controller 838 provides operating signals to the light source 828, light receiver 836, panoramic camera 866, zenith motor 872 and azimuth motor 888. The controller 838 compares the operational parameters to predetermined variances and if the predetermined variance is exceeded, generates a signal that alerts an operator to a condition. The data received by the controller 838 may be displayed on a user interface 840 coupled to controller 838. The user interface may be one or more LEDs (light-emitting diodes), an LCD (liquid-crystal diode) display, a CRT (cathode ray tube) display, a touch-screen display or the like. A keypad may also be coupled to the user interface for providing data input to controller 838.

In one embodiment, the user interface is arranged or executed on a mobile computing device that is coupled for communication, such as via a wired or wireless communications medium (e.g. Ethernet, serial, USB, Bluetooth™ or WiFi) for example, to the laser scanner 820.

The controller 838 may also be coupled to external computer networks such as a local area network (LAN) and the Internet. A LAN interconnects one or more remote computers, which are configured to communicate with controller 838 using a well-known computer communications protocol such as TCP/IP (Transmission Control Protocol/Internet(^) Protocol), RS-232, ModBus, and the like. Additional systems 820 may also be connected to LAN with the controllers 838 in each of these systems 820 being configured to send and receive data to and from remote computers and other systems 820. The LAN may be connected to the Internet. This connection allows controller 838 to communicate with one or more remote computers connected to the Internet.

The processors 886 are coupled to memory 891. The memory 891 may include random access memory (RAM) device 892, a non-volatile memory (NVM) device 893, and a read-only memory (ROM) device 894. In addition, the processors 886 may be connected to one or more input/output (I/O) controllers 895 and a communications circuit 896. In an embodiment, the communications circuit 896 provides an interface that allows wireless or wired communication with one or more external devices or networks, such as the LAN discussed above.

Controller 838 includes operation control methods embodied in application code shown in FIG. 3. These methods are embodied in computer instructions written to be executed by processors 886, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing.

Referring now to FIGS. 9A-9I, an embodiment is shown of a triangulation type scanner 910, sometimes referred to as a handheld 3D imager, that may be used with the method 300. In an embodiment, the scanner 910 includes a first infrared (IR) camera 920, a second IR camera 940, a registration camera 930, a projector 950, an Ethernet cable 960 and a handle 970. In an embodiment, the registration camera 930 is a color camera. Ethernet is a family of computer networking technologies standardized under IEEE 802.3. The enclosure 980 includes the outmost enclosing elements of the scanner 10. In an embodiment, the scanner 910 includes buttons or actuators that may be programmed to perform functions according to the instructions of a computer program, the computer program either stored internally within the scanner 910 or externally in an external computer. In an embodiment, the scanner 910 is the same as described in U.S. Patent Application Ser. No. 62/818,923 filed on Mar. 15, 2019, the contents of which are incorporated by reference herein.

FIG. 9B is a block diagram of system electronics 9400 that in an embodiment is included in the scanner system 910. In an embodiment, the electronics 9400 includes electronics 9410 within the handheld scanner 910, electronics 9470 within a mobile personal computer (PC) 9300, electronics within a mobile computing device 9200 (e.g. cellular phone), electronics within other electronic devices such as accessories that attach to the accessory interface 9000, and electronics such as external computers that cooperate with the scanner system electronics 9400. In an embodiment, the electronics 9410 includes a circuit baseboard 9412 that includes a sensor collection 9420 and a computing module 9430. In an embodiment, the sensor collection 9420 includes an IMU and one or more temperature sensors. In an embodiment, the computing module 9430 includes a system-on-a-chip (SoC) field programmable gate array (FPGA) 9432. In an embodiment, the SoC FPGA 9432 is a Cyclone V SoC FPGA that includes dual 800 MHz Cortex A9 cores, which are Advanced RISC Machine (ARM) devices. The Cyclone V SoC FPGA is manufactured by Intel Corporation, with headquarters in Santa Clara, Calif. In an embodiment, the computing module 9430 further includes an embedded MultiMedia Card (eMMC) 9440 having flash memory, a clock generator 9442, a power supply 9444, an FPGA configuration device 9446, and interface board connectors 9448 for electrical communication with the rest of the system.

Signals from the infrared (IR) cameras 9610A, 9610B and the registration camera 9612 are fed from the camera boards 9510 through ribbon cables 9516 to connectors. Image signals 9452A, 9452B, 9452C from the ribbon cables 9516 are processed by the computing module 9430. In an embodiment, the computing module 9430 provides a signal 9453 that initiates emission of light from the laser pointer 9730. A TE control circuit communicates with the TE cooler within the infrared laser 9700 through a bidirectional signal line 9454. In an embodiment, the TE control circuit is included within the SoC FPGA 9432. In another embodiment, the TE control circuit is a separate circuit on the baseboard 9412. A control line 9455 sends a signal to the fan assembly 9980 to set the speed of the fans. In an embodiment, the controlled speed is based at least in part on the temperature as measured by temperature sensors within the sensor unit 9420. In an embodiment, the baseboard 9412 receives and sends signals to buttons 9210 and their LEDs through the signal line 9456. In an embodiment, the baseboard 9412 sends over a line 9461 a signal to an illumination module 1460 that causes white light from LEDs to be turned on or off.

In an embodiment, bidirectional communication between the electronics 9410 and the electronics 9470 is enabled by Ethernet communications link 9465. In an embodiment, the Ethernet link is provided by the cable 960. In an embodiment, the cable 960 attaches to the mobile PC 9300. The Ethernet communications link 9465 is further operable to provide or transfer power to the electronics 9410 through the user of a custom Power over Ethernet (PoE) module 9472 coupled to the battery 9474. In an embodiment, the mobile PC 9470 further includes a PC module 9476, which in an embodiment is an Intel® Next Unit of Computing (NUC) processor. The NUC is manufactured by Intel Corporation, with headquarters in Santa Clara, Calif. In an embodiment, the mobile PC 9470 is configured to be portable, such as by attaching to a belt and carried around the waist or shoulder of an operator.

Figure 10:
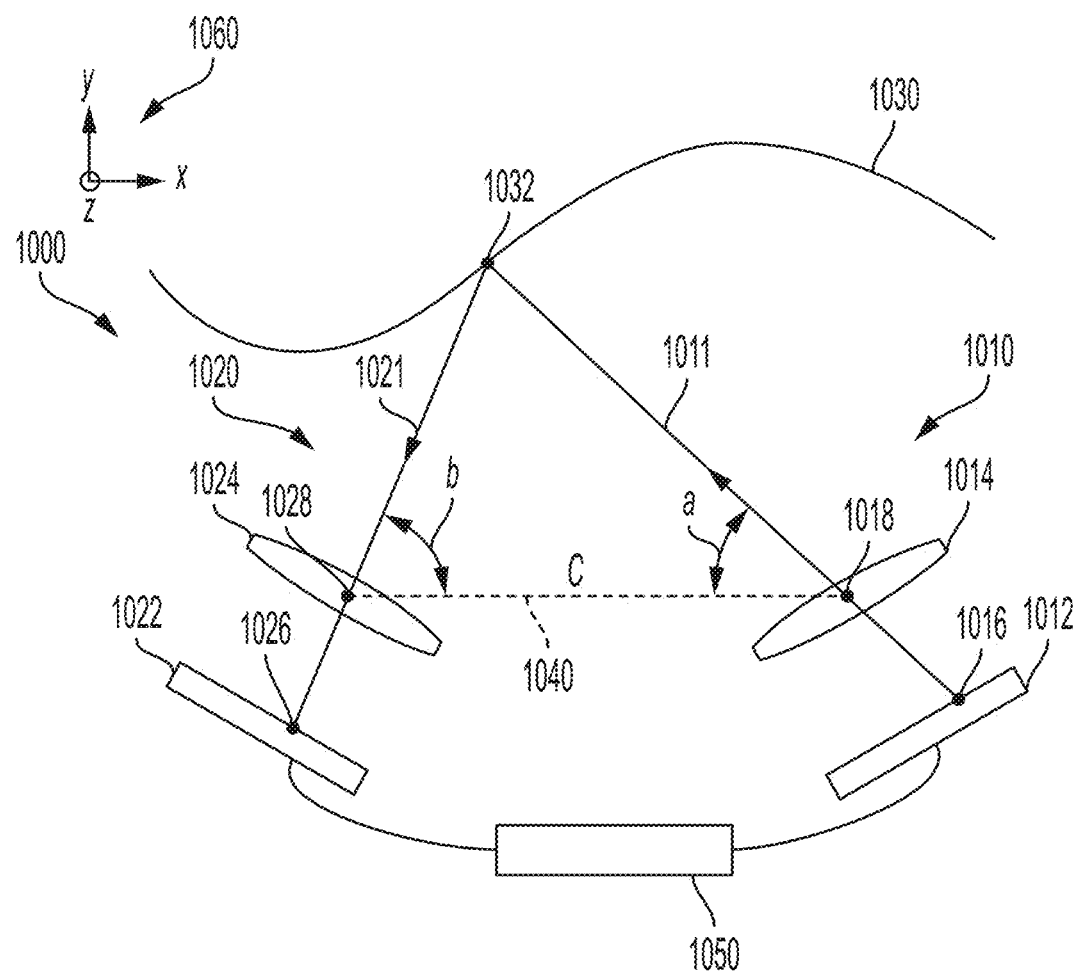

FIG. 10 shows a triangulation scanner (3D imager) 1000 that projects a pattern of light over an area on a surface 1030. The scanner 1000, which has a frame of reference 1060, includes a projector 1010 and a camera 1020. In an embodiment, the projector 1010 includes an illuminated projector pattern generator 1012, a projector lens 1014, and a perspective center 1018 through which a ray of light 1011 emerges. The ray of light 1011 emerges from a corrected point 1016 having a corrected position on the pattern generator 1012. In an embodiment, the point 1016 has been corrected to account for aberrations of the projector, including aberrations of the lens 1014, in order to cause the ray to pass through the perspective center 1018, thereby simplifying triangulation calculations. In an embodiment, the pattern generator 1012 includes alight source that sends a beam of light through a DOE. For example, the light source might be the infrared laser 9700 and the DOE might be the DOE 9713. A beam of light from the infrared laser 9700 passes through the DOE, which diffracts the light into a diverging pattern such as a diverging grid of spots. In an embodiment, one of the projected rays of light 1011 has an angle corresponding to the angle a in FIG. 10. In another embodiment, the pattern generator 1012 includes a light source and a digital micromirror device (DMD). In other embodiments, other types of pattern generators 1012 are used.

The ray of light 1011 intersects the surface 1030 in a point 1032, which is reflected (scattered) off the surface and sent through the camera lens 1024 to create a clear image of the pattern on the surface 1030 of a photosensitive array 1022. The light from the point 1032 passes in a ray 1021 through the camera perspective center 1028 to form an image spot at the corrected point 1026. The position of the image spot is mathematically adjusted to correct for aberrations of the camera lens. A correspondence is obtained between the point 1026 on the photosensitive array 1022 and the point 1916 on the illuminated projector pattern generator 1012. As explained herein below, the correspondence may be obtained by using a coded or an uncoded pattern of projected light. Once the correspondence is known, the angles a and b in FIG. 10 may be determined. The baseline 1040, which is a line segment drawn between the perspective centers 1018 and 1028, has a length C. Knowing the angles a, b and the length C, all the angles and side lengths of the triangle 1028-1032-1018 may be determined. Digital image information is transmitted to a processor 1050, which determines 3D coordinates of the surface 1030. The processor 1050 may also instruct the illuminated pattern generator 1012 to generate an appropriate pattern.

Figure 11A:
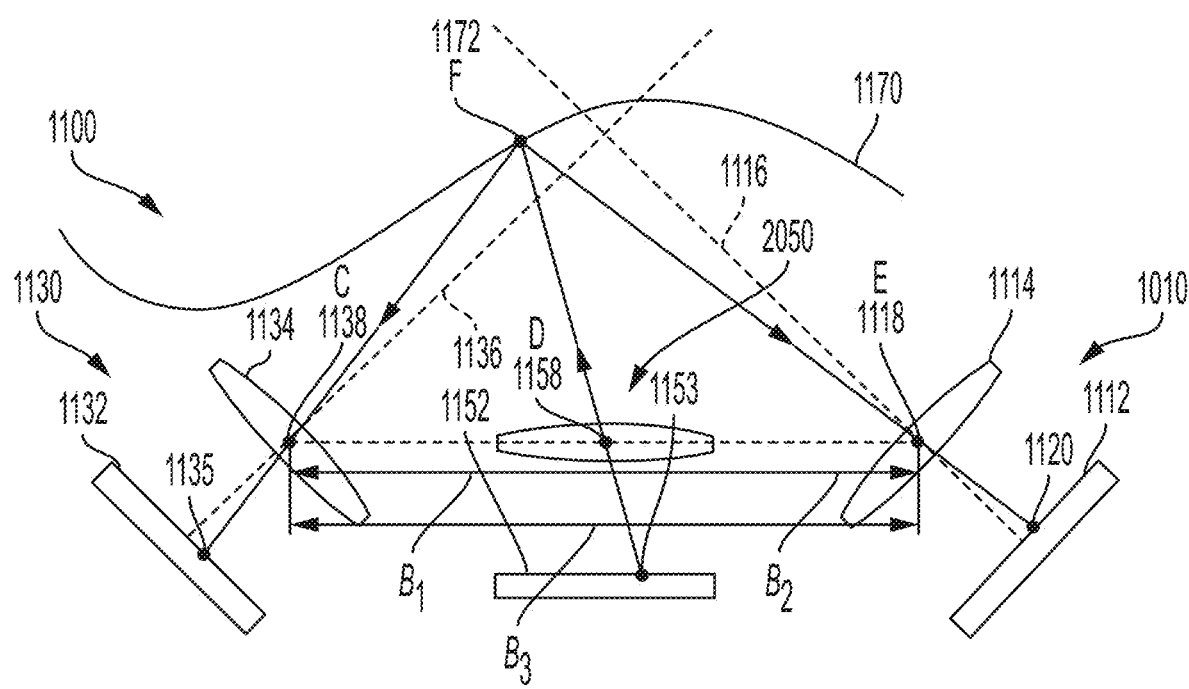

FIG. 11A shows a structured light triangulation scanner 1100 having a projector 1150, a first camera 1110, and a second camera 1130. The projector 1150 creates a pattern of light on a pattern generator 1152, which it projects from a corrected point 1153 of the pattern through a perspective center 1158 (point D) of the lens 1154 onto an object surface 1170 at a point 1172 (point F). In an embodiment, the pattern generator is a DOE that projects a pattern based on principles of diffractive optics. In other embodiments, other types of pattern generators are used. The point 1172 is imaged by the first camera 1110 by receiving a ray of light from the point 1172 through a perspective center 1118 (point E) of a lens 1114 onto the surface of a photosensitive array 1112 of the camera as a corrected point 1120. The point 1120 is corrected in the read-out data by applying a correction factor to remove the effects of lens aberrations. The point 1172 is likewise imaged by the second camera 1130 by receiving a ray of light from the point 1172 through a perspective center 1138 (point C) of the lens 1134 onto the surface of a photosensitive array 1132 of the second camera as a corrected point 1135. It should be understood that any reference to a lens in this document is understood to mean any possible combination of lens elements and apertures.

Figure 11B:
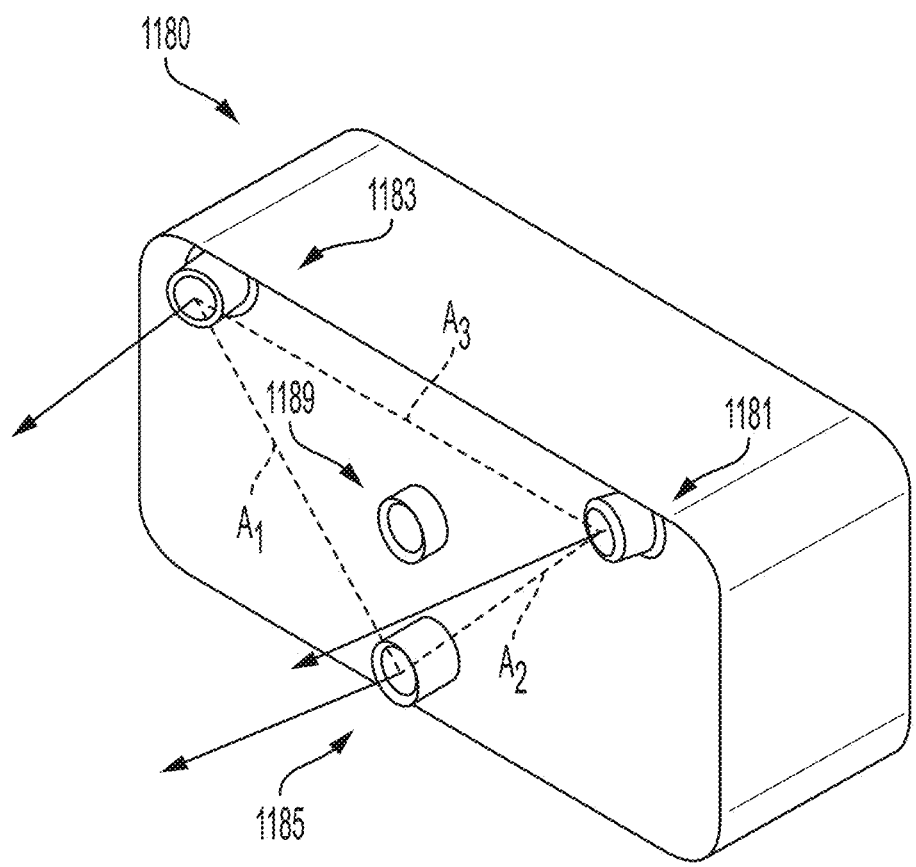

FIG. 11B shows 3D imager 1180 having two cameras 1181, 1183 and a projector 1185 arranged in a triangle A1-A2-A3. In an embodiment, the 3D imager 1180 of FIG. 11B further includes a camera 1189 that may be used to provide color (texture) information for incorporation into the 3D image. In addition, the camera 1189 may be used to register multiple 3D images through the use of videogrammetry. This triangular arrangement provides additional information beyond that available for two cameras and a projector arranged in a straight line as illustrated in FIG. 11A. The additional information may be understood in reference to FIG. 12, which explains the concept of epipolar constraints, and FIG. 13, which explains how epipolar constraints are advantageously applied to the triangular arrangement of the 3D imager 1180. In an embodiment, the elements 1181, 1183, 1185, 1189 in FIG. 11B correspond to the elements 940, 920, 950, 930 in FIG. 9.

Figure 12:
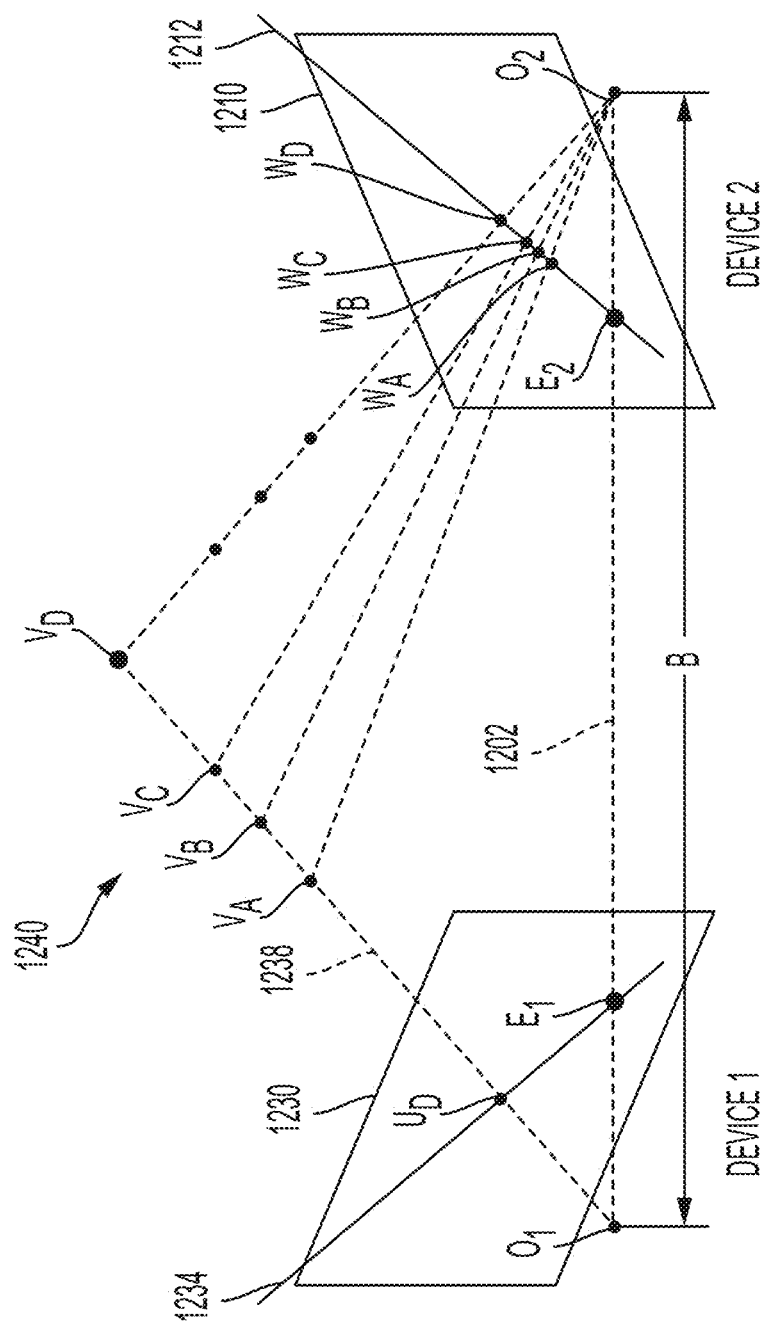

In FIG. 12, a 3D triangulation instrument 1240 includes a device 1 and a device 2 on the left and right sides, respectively. Device 1 and device 2 may be two cameras or device 1 and device 2 may be one camera and one projector. Each of the two devices, whether a camera or a projector, has a perspective center, $O_1$ and $O_2$, and a reference plane, 1230 or 1210. The perspective centers are separated by a baseline distance B, which is the length of the line 1202 between $O_1$ and $O_2$. The perspective centers $O_1$, $O_2$ are points through which rays of light may be considered to travel, either to or from a point on an object. These rays of light either emerge from an illuminated projector pattern or impinge on a photosensitive array.

In FIG. 12, a device 1 has a perspective center $O_1$ and a reference plane 1230, where the reference plane 1230 is, for the purpose of analysis, equivalent to an image plane of the object point $O_1$ 1230. In other words, the reference plane 1230 is a projection of the image plane about the perspective center $O_1$. A device 2 has a perspective center $O_2$ and a reference plane 1210. A line 1202 drawn between the perspective centers $O_1$ and $O_2$ crosses the planes 1230 and 1210 at the epipole points $E_1$, $E_2$, respectively. Consider a point $U_D$ on the plane 1230. If device 1 is a camera, an object point that produces the point $U_D$ on the reference plane 1230 (which is equivalent to a corresponding point on the image) must lie on the line 1238. The object point might be, for example, one of the points $V_A$, $V_B$, $V_C$, or $V_D$. These four object points correspond to the points $W_A$, $W_B$, $W_C$, $W_D$, respectively, on the reference plane 1210 of device 2. This is true whether device 2 is a camera or a projector. It is also true that the four points lie on a straight line 1212 in the plane 1210. This line, which is the line of intersection of the reference plane 1210 with the plane of $O_1$-$O_2$-$U_D$, is referred to as the epipolar line 1212. It follows that any epipolar line on the reference plane 1210 passes through the epipole $E_2$. Just as there is an epipolar line on the reference plane 1210 of device 2 for any point $U_D$ on the reference plane of device 1, there is also an epipolar line 1234 on the reference plane 1230 of device 1 for any point on the reference plane 1210 of device 2.

Figure 13:
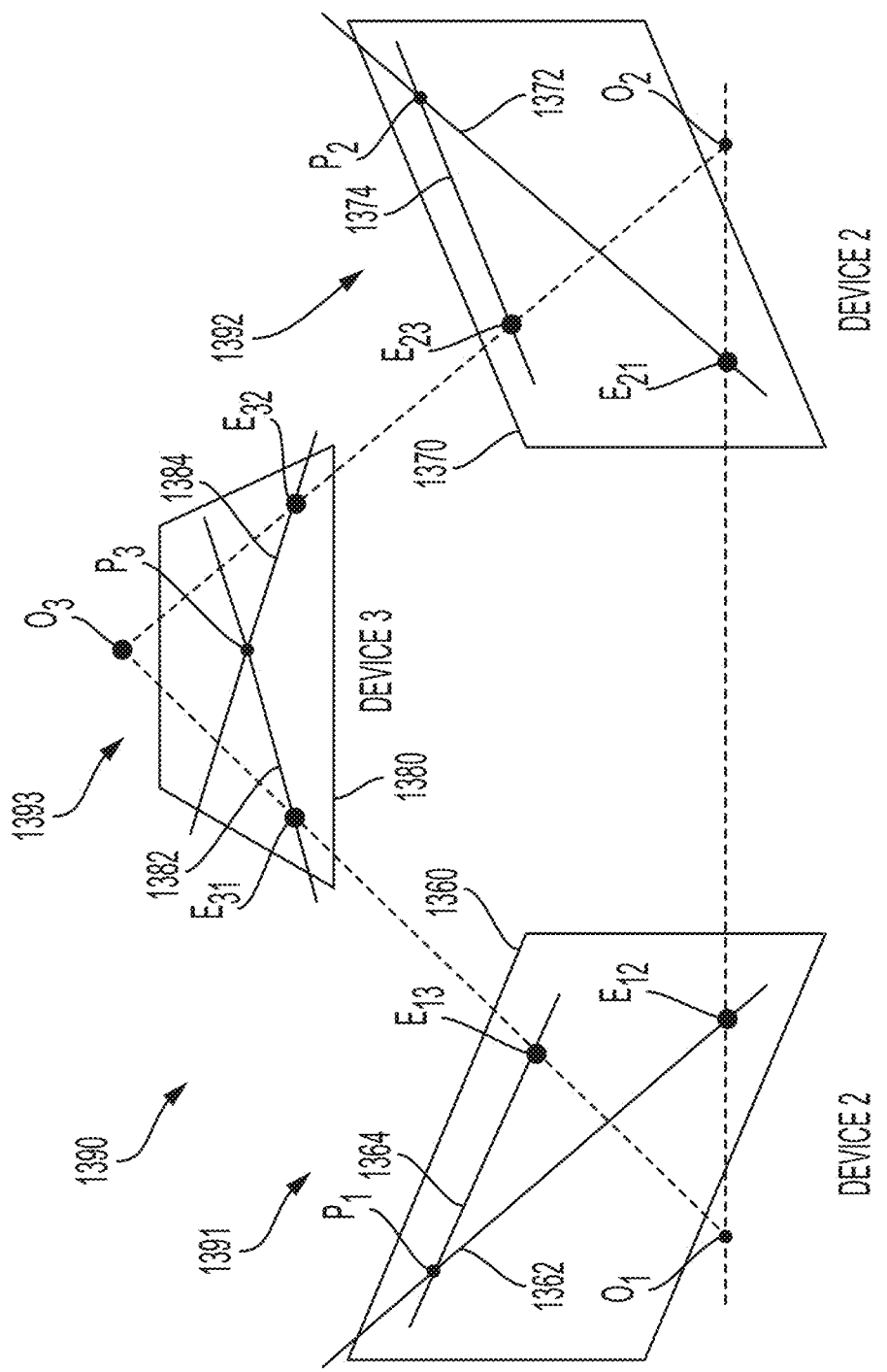

FIG. 13 illustrates the epipolar relationships for a 3D imager 1390 corresponding to 3D imager 1380 of FIG. 11B in which two cameras and one projector are arranged in a triangular pattern. In general, the device 1, device 2, and device 3 may be any combination of cameras and projectors as long as at least one of the devices is a camera. Each of the three devices 1391, 1392, 1393 has a perspective center $O_1$, $O_2$, $O_3$, respectively, and a reference plane 1360, 1370, and 1380, respectively. Each pair of devices has a pair of epipoles. Device 1 and device 2 have epipoles $E_{12}$, $E_{21}$ on the planes 1360, 1370, respectively. Device 1 and device 3 have epipoles $E_{13}$, $E_{31}$, respectively on the planes 1360, 1380, respectively. Device 2 and device 3 have epipoles $E_{23}$, $E_{32}$ on the planes 1370, 1380, respectively. In other words, each reference plane includes two epipoles. The reference plane for device 1 includes epipoles $E_{12}$ and $E_{13}$. The reference plane for device 2 includes epipoles $E_{21}$ and $E_{23}$. The reference plane for device 3 includes epipoles $E_{31}$ and $E_{32}$.

Consider the situation of FIG. 13 in which device 3 is a projector, device 1 is a first camera, and device 2 is a second camera. Suppose that a projection point $P_3$, a first image point $P_1$, and a second image point $P_2$ are obtained in a measurement. These results can be checked for consistency in the following way.

To check the consistency of the image point $P_1$, intersect the plane $P_3$-$E_{31}$-$E_{13}$ with the reference plane 1360 to obtain the epipolar line 1364. Intersect the plane $P_2$-$E_{21}$-$E_{12}$ to obtain the epipolar line 1362. If the image point $P_1$ has been determined consistently, the observed image point $P_1$ will lie on the intersection of the calculated epipolar lines 1362 and 1364.

To check the consistency of the image point $P_2$, intersect the plane $P_3$-$E_{32}$-$E_{23}$ with the reference plane 1370 to obtain the epipolar line 1374. Intersect the plane $P_1$-$E_{12}$-$E_{21}$ to obtain the epipolar line 1372. If the image point $P_2$ has been determined consistently, the observed image point $P_2$ will lie on the intersection of the calculated epipolar lines 1372 and 1374.

To check the consistency of the projection point $P_3$, intersect the plane $P_2$-$E_{23}$-$E_{32}$ with the reference plane 1380 to obtain the epipolar line 1384. Intersect the plane $P_1$-$E_{13}$-$E_{31}$ to obtain the epipolar line 1382. If the projection point $P_3$ has been determined consistently, the projection point $P_3$ will lie on the intersection of the calculated epipolar lines 1382 and 1384.

The redundancy of information provided by using a 3D imager having three devices (such as two cameras and one projector) enables a correspondence among projected points to be established even without analyzing the details of the captured images and projected pattern features. Suppose, for example, that the three devices include two cameras and one projector. Then a correspondence among projected and imaged points may be directly determined based on the mathematical constraints of the epipolar geometry. This may be seen in FIG. 13 by noting that a known position of an illuminated point on one of the reference planes 1360, 1370, 1380 automatically provides the information needed to determine the location of that point on the other two reference planes. Furthermore, once a correspondence among points has been determined on each of the three reference planes 1360, 1370, 1380, a triangulation calculation may be performed using only two of the three devices of FIG. 13. A description of such a triangulation calculation is discussed in relation to FIG. 10.

Figure 14:
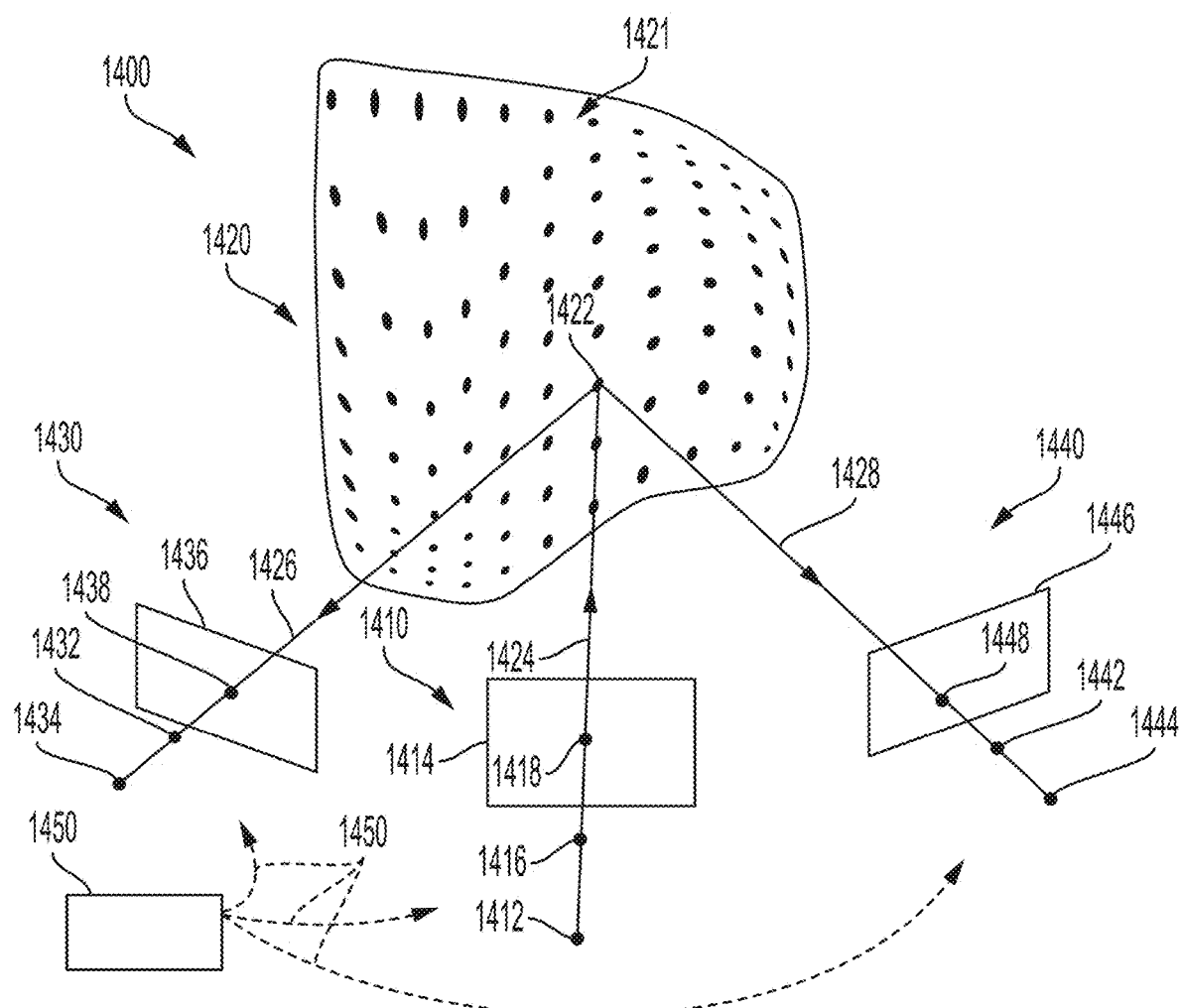

By establishing correspondence based on epipolar constraints, it is possible to determine 3D coordinates of an object surface by projecting uncoded spots of light. An example of projection of uncoded spots is illustrated in FIG. 14. In an embodiment, a projector 1410 projects a collection of identical spots of light 1421 on an object 1420. In the example shown, the surface of the object 1420 is curved in an irregular manner causing an irregular spacing of the projected spots on the surface. One of the projected points is the point 1422, projected from a projector source element 1412 and passing through the perspective center 1416 as a ray of light 1424 forms a point 1418 on the reference plane 1414.

The point or spot of light 1422 on the object 1420 is projected as a ray of light 1426 through the perspective center 1432 of a first camera 1430, resulting in a point 1434 on the image sensor of the camera 1430. The corresponding point on the reference plane 1436 is 1438. Likewise, the point or spot of light 1422 is projected as a ray of light 1428 through the perspective center 1442 of a second camera 1440, resulting in a point 1444 on the image sensor of the camera 1440. The corresponding point on the reference plane 1446 is 1448. In an embodiment, a processor 1450 is in communication with the projector 1410, first camera 1430, and second camera 1440. The processor determines a correspondence among points on the projector 1410, first camera 1430, and second camera 1440. In an embodiment, the processor 1450 performs a triangulation calculation to determine the 3D coordinates of the point 1422 on the object 1420. An advantage of a scanner 1400 having three device elements, either two cameras and one projector or one camera and two projectors, is that correspondence may be determined among projected points without matching projected feature characteristics. In other words, correspondence can be established among spots on the reference planes 1436, 1414, and 1446 even without matching particular characteristics of the spots. The use of the three devices 1410, 1430, 1440 also has the advantage of enabling identifying or correcting errors in compensation parameters by noting or determining inconsistencies in results obtained from triangulation calculations, for example, between two cameras, between the first camera and the projector, and between the second camera and the projector.

It should be appreciated that in some embodiments, the generation of the point cloud may include scans performed by both a time of flight type scanner and a triangulation scanner where one or more scans are performed by both scanners and the 3D coordinates measured by each scan are registered into a common coordinate frame of reference.

The term "about" is intended to include the degree of error associated with measurement of the particular quantity based upon the equipment available at the time of filing the application. For example, "about" can include a range of ±8% or 5%, or 2% of a given value.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A method for documenting a scene having evidence markers, the method comprising:
   placing the evidence markers in the scene;
   measure a plurality of 3D coordinates of points on surfaces in the environment, a first portion of the plurality of 3D coordinates being on a first evidence marker of the evidence markers, the evidence marker having a photogrammetric symbol on one surface;
   generating a point cloud from the plurality of 3D coordinates;
   automatically identifying the first evidence marker in the point cloud based at least in part on the photogrammetric symbol; and
   storing the location and at least one attribute of the evidence marker.

2. The method of claim 1, wherein the location is the center of the photogrammetric symbol.

3. The method of claim 1, wherein the at least one attribute is an alphanumeric indicator.

4. The method of claim 3, wherein the alphanumeric indicator is an evidence tag.

5. The method of claim 1, further comprising displaying the point cloud, and associating data with the first evidence marker, wherein the data includes information on an object or substance adjacent the first evidence marker.

6. A system for documenting a scene, the system comprising:
   at least one evidence marker, the evidence marker having a first side and an opposing second side, the first side having a photogrammetric symbol;
   a three-dimensional (3D) measurement device configured to acquire a plurality of 3D coordinates of points on surfaces in the scene, the plurality of 3D coordinates including a first plurality of 3D coordinates of the first side; and
   one or more processors configured to identify the at least one evidence marker based at least in part on the first plurality of 3D coordinates.

7. The system of claim 6, wherein the one or more processors are further configured to determine a location of the at least one evidence marker from the first plurality of 3D coordinates.

8. The system of claim 7, wherein the location is determined based at least in part on the photogrammetric target.

9. The system of claim 8, wherein the location is a center of the photogrammetric target.

10. The system of claim 6, wherein the at least one evidence marker further includes an alphanumeric indicator on the first side and the second side.

11. The system of claim 10, wherein the at least one evidence marker further includes a first end and a second end, the first end and the second end each having a the alphanumeric indicator.

12. The system of claim 6, wherein the one or more processors are further configured to associate data with the first evidence marker, wherein the data includes information on an object or substance adjacent the first evidence marker.

13. A computer program product for documenting a scene having at least one evidence marker, the computer program product comprising a non-transitory computer readable storage medium having program instructions embodied therewith, the program instructions executable by a processor to cause the processor to perform:

measuring a plurality of 3D coordinates of points on surfaces in the environment, a first portion of the plurality of 3D coordinates being on the at least one evidence marker, the at least one evidence marker having a photogrammetric symbol on one surface;

generating a point cloud from the plurality of 3D coordinates;

automatically identifying the first evidence marker in the point cloud based at least in part on the photogrammetric symbol; and storing the location and at least one attribute of the evidence marker.

14. The computer program product of claim 13, wherein the location is the center of the photogrammetric symbol.

15. The method of claim 13, wherein the at least one attribute is an alphanumeric indicator.

16. The method of claim 15, wherein the alphanumeric indicator is an evidence tag.

17. The method of claim 13, further comprising displaying the point cloud, and associating data with the first evidence marker, wherein the data includes information on an object or substance adjacent the first evidence marker.

* * * * *